US00RE34976E

United States Patent [19]

Helferich et al.

[11] E Patent Number: Re. 34,976

[45] Reissued Date of Patent: Jun. 20, 1995

[54] ANALOG/DIGITAL VOICE STORAGE CELLULAR TELEPHONE

[75] Inventors: Richard J. Helferich, 8408 Sterling Bridge Rd., Chapel Hill, N.C. 27516; Martin A. Schwartz, Santa Monica, Calif.

[73] Assignees: Richard J. Helferich, Chapel Hill, N.C.; Martin A. Schwartz Revocable (Living) 1991 Trust, Santa Monica, Calif.

[21] Appl. No.: 13,022

[22] Filed: Feb. 1, 1993

Related U.S. Patent Documents

Reissue of:

[64] Patent No.: 5,003,576
Issued: Mar. 26, 1991
Appl. No.: 338,290
Filed: Apr. 14, 1989

U.S. Applications:

[63] Continuation-in-part of Ser. No. 110,002, Oct. 19, 1987, abandoned, and Ser. No. 110,201, Oct. 19, 1987, Pat. No. 4,864,301, which is a continuation-in-part of Ser. No. 77,496, Jul. 24, 1987, Pat. No. 4,905,003.

[51] Int. Cl.[6] ..... H04M 1/65; H04M 11/00

[52] U.S. Cl. ..... 379/88; 379/59; 379/63

[58] Field of Search ..... 379/58, 59, 63, 62, 379/88, 67; 360/32

[56] References Cited

U.S. PATENT DOCUMENTS

| | | |
|---|---|---|
| 3,073,896 | 1/1963 | James . |
| 3,219,934 | 11/1965 | Kalfaian . |
| 3,349,184 | 10/1967 | Morgan . |
| 3,437,760 | 4/1969 | Kawashima et al. . |
| 3,466,392 | 9/1969 | Calfee et al. . |
| 3,470,472 | 9/1969 | Suzuki et al. . |
| 3,651,413 | 3/1972 | Wycoff . |
| 3,654,560 | 4/1972 | Cath et al. . |
| 3,659,048 | 4/1972 | Zuerblis et al. . |
| 3,662,380 | 5/1972 | Cargile . |
| 3,716,848 | 2/1973 | Schonholtz et al. . |
| 3,731,279 | 5/1973 | Halsall et al. . |
| 3,740,488 | 6/1973 | Linfield et al. . |

(List continued on next page.)

FOREIGN PATENT DOCUMENTS

| | | | |
|---|---|---|---|
| 0297368 | 1/1989 | European Pat. Off. . | |
| 2715332 | 10/1978 | Germany . | |
| 0294961 | 12/1986 | Japan | 379/201 |
| 0046044 | 2/1988 | Japan | 379/88 |
| 2143705 | 2/1985 | United Kingdom . | |
| 2181624 | 4/1987 | United Kingdom . | |
| WO8901264 | 2/1989 | WIPO . | |

OTHER PUBLICATIONS

Advertisement for "Two tone, tone and voice Pagers," distributed by ICM Communication, Radio Communications Report, Oct. 16, 1988, p. 15.

The Engineering Staff of Analog Devices, Inc. Ana- (List continued on next page.)

*Primary Examiner*—Thomas W. Brown
*Attorney, Agent, or Firm*—Knobbe, Martens, Olson & Bear

[57] ABSTRACT

An analog-to-digital voice storage cellular telephone for recording voice messages while the user is away from the cellular telephone unit. In a preferred embodiment, the analog-to-digital voice storage cellular telephone comprises call answering circuitry which is activated after a predetermined number of rings. Detection circuitry waits to detect a SAT signal during a preset period of time. Once the SAT signal is detected a prerecorded outgoing message is transmitted to the caller. The voice storage cellular telephone records incoming voice messages. which are retrieved and replayed by users at their convenience. If the SAT signal is not detected, call terminating circuitry immediately terminates call. In accordance with one aspect, voice messages may be recorded at the central cellular station in real time, subsequently transmitted to the voice storage cellular telephone at a high speed and reproduced at normal speed to reduce air transmission time and cost.

19 Claims, 16 Drawing Sheets

U.S. PATENT DOCUMENTS

| | | | |
|---|---|---|---|
| 3,783,384 | 1/1974 | Wycoff . | |
| 3,909,811 | 9/1975 | Adler . | |
| 3,936,610 | 2/1976 | Schiffman . | |
| 3,947,832 | 3/1976 | Rosgen et al. . | |
| 3,950,607 | 4/1976 | Southworth et al. . | |
| 3,958,235 | 5/1976 | Duffy . | |
| 4,042,906 | 8/1977 | Ezell . | |
| 4,124,773 | 11/1978 | Elkins | 379/101 |
| 4,181,893 | 1/1980 | Ehmke . | |
| 4,233,500 | 11/1980 | Cordill . | |
| 4,264,898 | 4/1981 | Barman et al. . | |
| 4,356,519 | 10/1982 | Cogdell, Jr. . | |
| 4,371,752 | 2/1983 | Matthews et al. | 379/88 |
| 4,408,099 | 10/1983 | Ishii | 379/57 |
| 4,443,787 | 4/1984 | Denk et al. | 341/11 |
| 4,468,813 | 8/1984 | Burke et al. | 455/38 |
| 4,479,124 | 10/1984 | Rodriguez et al. | 340/825.44 |
| 4,495,647 | 1/1985 | Burke et al. | 455/38 |
| 4,499,567 | 2/1985 | Armstrong | 369/7 |
| 4,518,827 | 5/1985 | Sagara | 379/88 |
| 4,549,047 | 10/1985 | Brian et al. | 379/88 |
| 4,573,140 | 2/1986 | Szeto | 379/88 |
| 4,602,129 | 7/1986 | Matthews et al. | 379/88 |
| 4,640,991 | 2/1987 | Matthews et al. | 379/88 |
| 4,652,857 | 3/1987 | Meiksin | 381/31 |
| 4,673,916 | 6/1987 | Kitamura et al. . | |
| 4,695,825 | 9/1987 | Bloy et al. . | |
| 4,731,811 | 3/1988 | Dubus | 379/58 |
| 4,742,560 | 5/1988 | Arai | 455/33 |
| 4,763,207 | 8/1988 | Podolak et al. | 360/32 |
| 4,772,873 | 9/1988 | Duncan | 341/110 |
| 4,998,291 | 3/1991 | Marui et al. | 455/89 |

OTHER PUBLICATIONS log/Digital Conversion Handbook, Jun. 1972, pp. I-2&3; I-841 to 109; II-46 to II-53.

Z. H. Meiksin and Philip C./Thackray, Electronic Design with off-the Shelf Integrated Circuits, Parker Publishing Company, Inc. 1980, pp. 170-172.

Advertisement for "SHINWA" distributed by ICM Communications, Radio Communications Report, vol. 6, No. 8, Apr. 15, 1987, p. 28 "Mobile and Pager," pp. 37-38.

Frank Goodenough, "Analog EEPROMs Store 16 Seconds of Audio on Silicon Die 1/10 The Area Digital EEPROMs Need To Do The Job," Electronic Design, Jan. 31, 1991, pp. 39-44.

Information Storage Devices, Inc., "Single Chip Voice Message System"; ISD 1016 Series, Mar./1991, pp. 1-8.

ANALOG/DIGITAL VOICE STORAGE CELLULAR TELEPHONE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of copending application Ser. No. 110,002, filed Oct. 19, 1987 now abandoned, and Ser. No. 110,201, now issued as U.S. Pat. No. 4,864,301, filed on Oct. 19, 1987, each of which is a continuation-in-part of application Ser. No. 07/077,496, now issued as U.S. Pat. No. 4,905,003, filed Jul. 24, 1987, entitled "ANALOG/DIGITAL DATA STORAGE SYSTEM."

FIELD OF THE INVENTION

The present invention relates generally to the field of communication systems, and more particularly to a system for the conversion of analog signals to digital signals for digital storage and for the retrieval and reconversion to analog format of such signals for playback. Most specifically the present invention relates to an analog-to-digital voice storage cellular telephone, wherein messages are recorded when a user is away from the unit.

BACKGROUND OF THE INVENTION

The prior art is replete with various types of paging systems and radio-operated systems by which a message can be left for an individual who is not able to be contacted directly for one reason or another. For example, many paging systems operate with a large complex central processing facility in which messages are queued and transmitted, normally in digital form, to subscribers, along with the subscriber's address code. The subscriber to the service carries a paging unit which is preprogrammed to activate upon receiving a message which is preceded by the address code for that paging unit. The pager then normally emits an audible sound to alert the subscriber that a message is being received and recorded for him. The message is placed in the pager memory and the message is retrieved in the form of a written message, normally on an LED or LCD display green. Although such systems are efficient and require very little air time in order to send the digital message, the messages transmitted are necessarily of limited duration and are normally of the type which require the subscriber to go to the nearest telephone and call the message originator. In addition, unless the transmitted messages are strictly numeric, i.e., telephone numbers and the like, alphanumeric messages require a special terminal in order to input the alphanumeric message to be transmitted, and paging systems of this type require expensive computerized central message facilities.

Other paging systems are available which utilize a transmitter which transmits in analog form an audio message preceded by an address code which is received by a preprogrammed receiver. The message is played immediately upon receipt, and, in some units, the message can be recorded on a tape cassette for replay. Pagers of this type are normally relatively bulky and require substantially high power requirements to drive the mechanical portions of the tape recorder.

In the area of telephone communications, typically available answering machines have one or more tape cassettes for playing a message to the caller to indicate that the called party is not available to answer the phone and to record a message for later playback. Although answering machines are readily available for single-line use and their price is becoming more and more reasonable, such devices are normally not available as part of the telephone circuitry itself. Most of the existing answering machines are bulky and require a substantial amount of desktop space. Furthermore, answering machines are not readily available for multiline business phones and com-line, cellular or mobile recording.

Also in the area of telephone communications, the advent of cellular telephones has revolutionized mobile communications and has created a need for enhanced capabilities. Cellular telephones utilize sophisticated cellular technology and are faced with growing demand. Ongoing research in this area concentrates on providing additional conveniences and reducing costs. For example, presently, when a particular cellular user is away from his or her unit, a general recording from the central cellular station or site informs the caller that the particular user cannot be reached at the time. Thus, the caller has to take the initiative of calling again, which can result in several unavailing and frustrating attempts.

Most existing cellular telephones incorporate the capability of indicating to users if they received any calls during their absence by some sort of an indicator. This feature is sometimes useful and reassuring, especially when the user is expecting an important telephone call from a particular person while away from the unit. However, this feature is inadequate and does not solve the problem since it does not identify the caller, record the number at which the caller may be reached, nor indicate the total number of callers and their messages. Although answering machines for this purpose are available for standard telephones, such capabilities are not available with cellular telephones. Reducing costs is also another high priority since cellutar telephones are relatively expensive because calls are typically billed on a per-minute basis.

Yet another form of message service is the so-called voice storage retrieval system (VMS) in which a voice message can be left at a central message storage facility, and the subscriber, by use of a specific code, can access the memory at the central computer to retrieve the message. These systems are expensive to operate in view of the necessity of powerful computers at the central system facility to process and store the messages and, in addition, can be inconvenient to use since the subscriber must be at a telephone in order to receive the message. In addition, messages may not be timely received because the addressee inadvertently fails to check for messages.

In the area of two-way radio communication, such as in the case of police and fire communications, emergency communications and the like where the addressee may be away from the mobile unit from time to time, many systems employ the use of hand-held receivers, i.e., walkie-talkies, which may be patched into the mobile receiver for the receipt of incoming messages while the operator is away from the unit. Such devices are expensive and, in many cases, would be totally unnecessary if a reliable, inexpensive message storage system were available at the mobile unit. Some systems are available which are similar to the telephone answering machines for transmitting a prerecorded message and for recording incoming messages when the operator is not at the mobile unit. These systems have been found to be bulky, unreliable and inflexible in connection with radio communications.

A more sophisticated system has been promulgated in U.S. Pat. Nos. 4,468,813 to Burke, et al. and U.S. Pat. No. 4,495,647 to Burke, et al. This system requires a base unit which sends a command program packet in digital form to the mobile unit which is programmed to respond to the command program for receiving the message in analog form. The command packet includes numerous command codes, transmission of which require significant air time. Responsive to the command program, the mobile unit converts the message to digital form for storage and responsive to a termination command sent in digital form by the base unit, the mobile unit recording system is deactivated. The operator at the mobile unit can then replay the digital message in analog form. The system as disclosed in the aforementioned U.S. patents requires a sophisticated encoding system at the base transmitter which is capable of generating a command program packet and the termination code signal. Furthermore, the base transmitter must be capable of transmitting the command packet in the form described in the aforementioned patents. The mobile unit must be capable of receiving, decoding and transmitting the command program packet back to the base unit. The mobile unit utilized in such systems requires two separate power supplies which would render the device unsuitable for portable hand-held receivers, such as pagers and the like.

In the communications field, particularly in radio communications, transmission time is desirably maintained at a minimum. In radio communication, the available channels are crowded and there is great competition for air time. For this reason most paging systems involve the transmission of messages in digital format because the digital format requires less time to transmit. The messages received, however, are limited to short written messages which are displayed on a small LED or LCD display green and the messages are normally limited to the type that require the subscriber to go to a telephone and call the message originator. In addition to the limited message capability of such systems, the transmitting components are expensive, normally requiring centralized computer message facilities to transmit the digital data and to store the analog messages for the subscribers.

Accordingly, it would be highly desirable to provide a system for transmitting analog messages directly to a remote unit in which the analog messages are transmitted at a high rate of speed to conserve air time and are received and recorded at the remote unit for playback at a slower rate of speed to return the message to its audible condition. As a corollary, it would also be desirable to transmit certain analog data at a slow rate of speed and to play the message back at a higher rate of speed, again to return it to its audible format. Such a transmission procedure is beneficially earfled out in the transmission of music and other high fidelity analog data over telephone lines which normally adversely affect the fidelity of the data being transmitted. In such a ease it would be desirable to transmit the data at a slow rate of speed thereby to retain the fidelity and to play it back at its normal rate of speed without loss of fidelity.

SUMMARY OF THE INVENTION

In accordance with the present invention, there is provided an analog-to-digital data storage system which is readily adapted for use in communication systems such as paging systems, telephones, multi-line telephones, cellular telephones, intercom, message alarm systems, telemetry systems, two-way radios and the like, by which analog signals, including voice messages and data transmission, can be received, converted to digital format and stored in memory in digital format for retrieval, reconversion to analog form and playback as desired. In addition, the system permits sufficient memory for dictation of messages for later playback or transmission. The data storage system is easily installed on existing telephone and radio equipment at low cost and operates with very low power requirements. The data storage system is adapted to be activated by any conventional analog or digital address code such as, for example, digital code, tone, dual-tone multi-frequency (DTMF) or may even be voice activated (VOX). No specially modified transmitter is required for use with the system of the present invention. In addition, the means for deactivating the circuitry after receipt of a message is contained within the data storage system itself and, except for an address code (which is preferred but not critical), the necessity of transmitting a packet of command data to control the reception and recording of the message at the receiving unit and a termination code at the end of a message to deactivate the receiving unit is eliminated.

In accordance with the present invention, the analog-to-digital data storage system includes receiver means for receiving an incoming signal carrying an analog component from a suitable transmitter. The analog signal is preferably preceded by a designated address code which is specific to a particular data memory system. The system further includes enable means activated by the incoming signal to emit an enable signal (logic high) to activate the system circuitry, as will be hereinafter described and illustrated. The enable means may comprise a decoder which has been programmed to recognize an address code specified to a particular receiver or group of receivers. The enable means may also be activated by the incoming signal without an address code, such as in the case of a VOX circuit, to emit the enable signal. The system also includes conversion means for converting the incoming analog data to digital format and memory means for storing the convened digital data. The conversion means further includes circuitry for reconverting a digital signal to analog format. Control means are provided for activating the conversion means and the digital memory storage means responsive to the enable signal from the decoder means. In the preferred embodiment, the control means also acts to deactivate the conversion means and memory means at the completion of the message or after a predetermined period of time. Switching means are included for activating the conversion means and the memory means for playback in analog format of any stored messages. The system further includes switching means for manually activating the record and the playback modes, and amplifier means for listening to incoming analog signals and playback of stored messages.

The system of the present invention is readily adaptable for use with wire communication systems such as single and multi-line telephone systems, intercom systems, and for radio communication. Thus, the system of the present invention is useful for paging systems, two-way radio, cellular telephones, conventional telephone and intercom systems, and telemetry systems. The system is also useful for transmitting music and other data where high fidelity is required. The system of the invention employs circuitry that is readily installed with conventional transmission and receiving equipment. In a preferred form of the invention, the system is adapted for receiving analog messages which are transmitted at high speed and for playback of such messages after retrieval from memory at a slow speed so that the message may be understood by the mobile operator. In this fashion, air transmission time is substantially reduced which is of critical importance in those areas where the radio frequencies are crowded, such as in paging systems where assigned frequencies are limited and there are a large number of subscribers utilizing the system.

In accordance with one aspect of the present invention there is provided a communications system for the transmission of analog data at a first rate storage and playback of the message at a second rate. The system comprises transmitter means which includes a transmission buffer which communicates with a control terminal for the input of the data and with a transmitter for sending the analog message. The system further includes a receiver group including a receiver compatible with the transmitter for receiving the transmitted signal and which includes circuitry for storing the received signal in memory and for retrieving the signal from memory and converting it to usable format. It will be understood that signal rate conversion can occur prior to storing the signal in memory or subsequent to the signal retrieval from memory but prior to playback. Also, the signal may be transmitted at one rate, recorded at a second rate and played back at yet a third rate. Preferably, the encoding means at the transmitter buffer also encodes an address and speed code which can be recognized by the receiver group so that messages can be sent to specific receivers at various transmitter rates.

In accordance with another aspect, a cellular telephone or a voice storage telephone operating in cooperation with a plurality of transceiver stations without operator intervention having voice storage capabilities advantageously records messages while a user is away from the cellular unit. The voice storage circuitry incorporated therein is easily adapted for portable applications due to the low current requirementS and may be advantageously installed in the handset of a cellular telephone due to its small size. Call answering circuitry is activated after a predetermined number of rings to automatically answer an incoming call. Detection circuitry waits for a predetermined length of time to detect a SAT (Supervisory Audio Tone) signal. If the SAT signal is detected, a prerecorded outgoing message is transmitted to the caller. If the SAT signal is not detected during the predetermined length of time, the incoming call is automatically disconnected. Once the outgoing message has been received, the caller can leave a message which is recorded by the analog-to-digital voice storage circuit. A plurality of individual messages are stored sequentially and may be retrieved and reproduced by the user at a later time. In addition, a first recorded message oldest message stored in memory) is automatically erased first.

In accordance with one aspect of the analog-to-digital voice storage cellular telephone, messages are recorded at a central cellular station in real time and subsequently transmitted to the cellular telephone trait at high speed to save on transmission time. These messages are then recorded at the voice storage cellular unit at a high speed but are retrieved and reproduced at a normal speed. This is advantageous because incoming and outgoing calls are generally billed on a per-minute basis charged to the cellular subscriber.

In accordance with another aspect, the circuitry for answering a call is activated only by entering a personal identification code through the keypad of a telephone which is compared with a prestored code. However, in the instance that the identification code does not match the prestored address such as in the ease of a wrong number, the incoming call is immediately terminated. This future advantageously discounts costs associated with unauthorized callers.

In accordance with yet another aspect, the analog-to-digital storage cellular telephone also provides a means for recording dictated messages and reproducing dictated messages, wherein the user may record important voice notes or cellular conversations instead of writing notes. This future is of special importance during the operation of a vehicle for reasons of highway safety.

BRIEF DESCRIPTION OF THE DRAWINGS

The invention will be best understood in conjunction with the following description when taken in conjunction with the accompanying drawings in which.

DETAILED DESCRIPTION OF THE PREFERRED EMBODIMENTS

Figure 1:
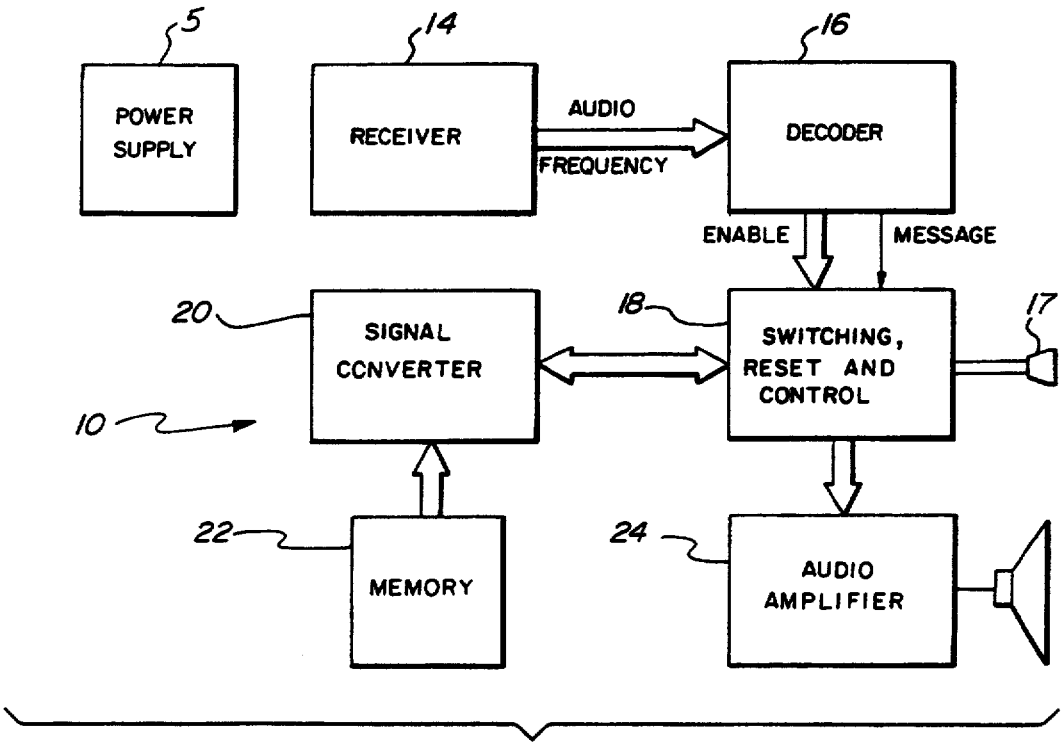
FIG. 1 is a block diagram of a digital voice storage system in accordance with the present invention.

Referring to FIG. 1, there is illustrated an analog-to-digital data memory system, indicated generally as 10, constructed in accordance with the present invention, which includes a power supply 5 and receiver means 14 for receiving incoming signals. The receiver 14 may consist of a radio receiver such as would be utilized with an audio paging system or with two-way radio systems, or may be a telephone or similar type device.

As such, a transmitter (not shown) will also be included in system 10. The incoming signals received by the receiving means are transmitted from any compatible transmitting device (not shown) which, as will be explained later, need not be especially modified for use with the receiver means 14 of the voice storage system 10. The transmitting medium may be hard-wire or wireless such as, for example, radio, infrared or optical. Enable means 16 is provided with decoder circuitry to compare the incoming signal with the receiver address to determine if the incoming message signal is addressed to the system 10. The enable means 16 can be adapted to monitor various types of encoded addresses such as, for example, digital code, tone code or dual-tone multiple frequency (DTMF). If the signal code matches the receiver address, the decoder. 16 issues an enable signal (pulse or continuous signal) which activates the record/store functions of the voice storage system 10. The use of an address code with the incoming message is not critical and, if desired, the enable can be simply a voice activated device which issues the enable signal upon receipt of an audio message or a switch for manual activation for entering and storing messages by the receiver operator. In one embodiment of the invention, the decoder 16 is designed to emit a continuous enable signal during the duration of the incoming analog signal, and the signal terminates at the end of the analog signal. The termination of the enable signal from the decoder 16 is utilized in other portions of the circuitry in a manner to be described in more detail hereinafter to deactivate the circuits of the system 10 and return it to the standby mode. In yet another embodiment of the invention, the decoder 16 issues a single pulse upon sensing an incoming message addressed to the system 10, and timer means are provided to return the system to the standby mode after the passage of a predetermined period of time from the initial enable pulse.

Control means 18 for switching, resetting and controlling the circuitry of the system 10 acts in response to the enable signal from the decoder 16 to control and activate the various circuits of the voice storage system 10. The incoming signal is passed on to the signal conversion means 20 for conversion from analog to digital format, and on to memory means 22 for storage in memory in digital format. The control means 18 also includes switching circuitry for activating the voice storage system 10 independently of an enable signal to recall from memory the stored messages and to reconvert the messages from digital to analog format for replay.

Audio amplifier means 24 are provided for listening to audio messages, both incoming and those retrieved from memory. Input means 17 are provided to directly enter messages to the control means 18 for conversion and storage by the receiver operator.

Figure 2:
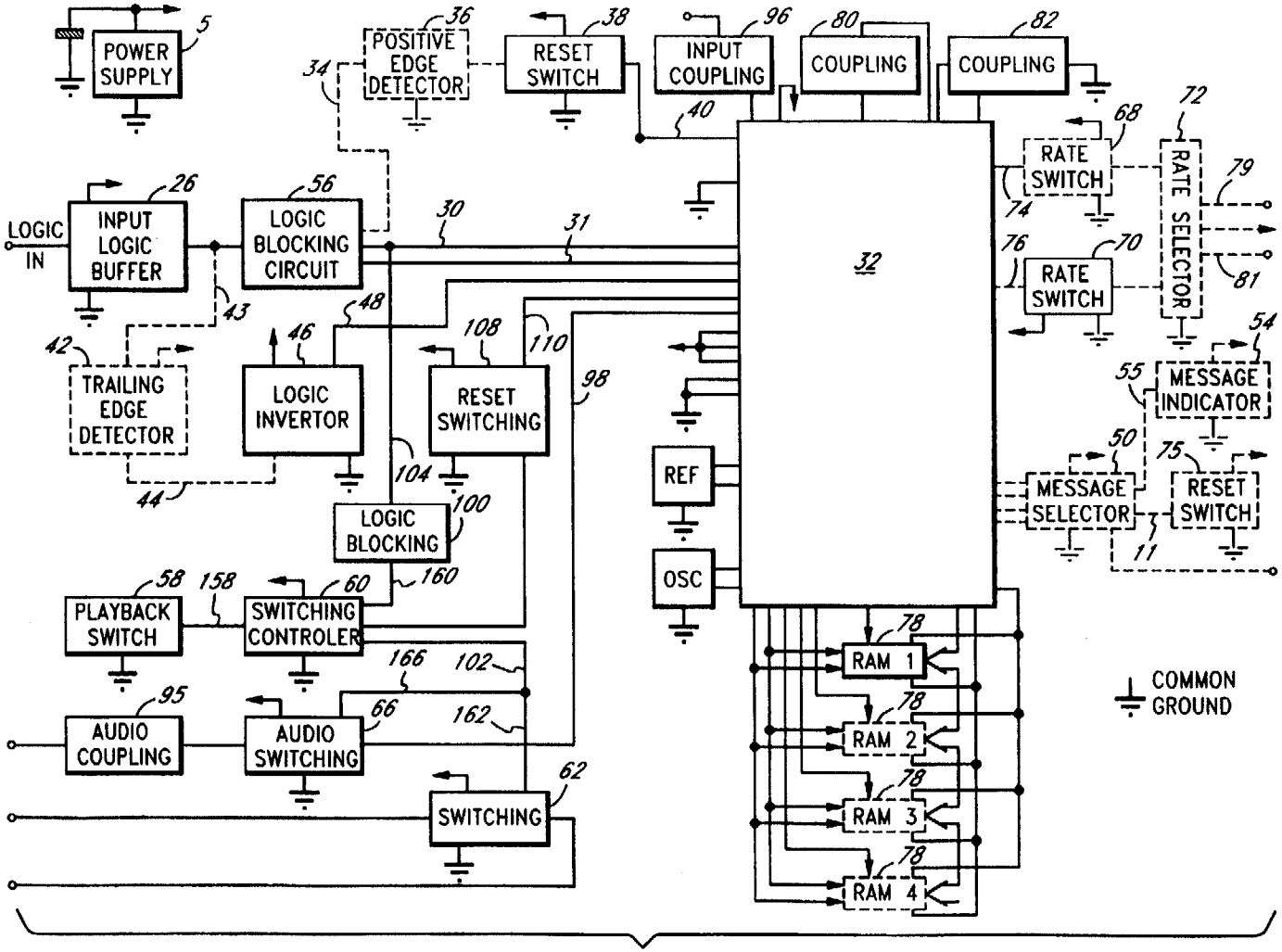
FIG. 2 is a block diagram of the audio conversion, switching and control circuits of FIG. 1.

Referring now to FIG. 2, there is shown a schematic diagram of the circuitry utilized in the control means 18, signal conversion means 20 and memory means 22 of the data memory system 10 illustrated in FIG. 1. As illustrated in FIG. 2, certain optional features of the system 10 are shown in phantom, and it should be understood that the system 10 is operable without any of the optional features, and that the selection of the particular optional feature to be incorporated in the circuit is a matter of choice, dependent upon the nature of the receiver in which the system is installed and the selected operating parameters for the system.

The power supply 5 comprises any suitable source of power and preferably has a potential of at least 3 volts. The control means 18 (as shown in FIG. 1) electrically communicates with the decoder 16 (not shown) through an input logic buffer 26 to a logic blocking circuit 56. The logic blocking circuit 56, which is of conventional diode design, distributes the enable signal (logic high) through a start line 30 and a record/play line 31 to a microprocessor 32. When the enable means or decoder 16 is of the type that issues a continuous logic high during the duration of the analog signal, it is highly preferred to include circuitry for automatically returning the system 10 to the standby mode upon completion of the analog signal, as indicated by a termination of the logic high. For this purpose, a trailing edge detector 42 is connected to a logic invertor 46 which in turn is connected to the microprocessor 32 through a stop line 48, the purpose and operation of which will be described in more detail hereinafter. The incoming analog signal is input to the microprocessor 32 through an analog input coupling 96 of conventional design. An audio switch 66 is connected to the microprocessor 32 by a line 98 for monitoring the incoming analog signal during the record mode. For automatic resetting of the system 10 to permit a sender to record over messages already in memory, there may be included a leading edge detector 36 to which the logic high is conveyed from the logic blocking circuit $6 by means of a line 34. The leading edge detector 36 is of conventional design and is connected to the microprocessor 32 through a reset switch 38 and a reset line 40.

A playback switch $8 is connected to a switching controller 60. The switching controller 60, more clearly illustrated in FIG. 3, consists of an invertor 112 and an invertor 114 which are coupled by resistors 116, 118 in a bi-stable (two-stable) state circuit of conventional design whose output at lines 102, 160 is normally low until inverted by activation of the switch 58 to initiate the playback mode. The output of the switching controller 60 remains high until it is inverted to its normal low by a reset switch 108.

The digital-to-analog conversion and analog-to-digital reconversion is accomplished by the microprocessor 32. The microprocessor 32 is of commercially available 60 design, such as one manufactured by Toshiba under Model No. T6668, and is provided with circuitry for converting analog to digital and reconverting digital to analog. Such conversion circuits are well known in the art and operate by generating an internal time base, sampling the analog signal input at some predetermined point in each of the time base segments, and then generating a digital output responsive to the sample level obtained during the sampling period. The microprocessor 32 is adapted for communication with a random access memory 78 which, in the embodiment illustrated, consists of four banks of four 256K bit chips for a total of 1024K bit memory per each bank. In the embodiment of the invention illustrated in FIG. 2, the system 10, when utilizing all four RAM banks, can store up to about 9 minutes of audio message at a bit rate of 8K BPS. Additional memory banks may be added as desired or needed, especially if the receiver operator intends to carry out a substantial amount of message recording, such as where the system 10 is to be used as a dictating unit.

In operation, an analog message, audio or data, is transmitted from a transmitter (not shown) to the receiver means 14 (FIG. 1). The message may be transmitted by any suitable means such as wire or wireless, and preferably is preceded by a designated address code of any of the commonly used types such as tone, DTMF, digital or the like. The analog signal received by the receiver 14 is transmitted to the enable or decoder 16 which, if the proper designated code is present or if the enable of decoder 16 is a VOX circuit, emits an enable signal (logic high) through the input logic buffer 26 to the logic blocking circuit 56. In the embodiment of the invention described thus far, the decoder 16 is of the type which emits a continuous logic high for the duration of the incoming analog signal. The logic high is conveyed through logic blocking circuit 56, the start line 30 and the record/playback line 31 to the microprocessor 32. In addition, the logic blocking circuit 56 conveys a logic high through the line 34 to the leading edge detector 36 which emits a pulse to close the reset switch 38. In the closed position, the reset switch 38 completes the circuit, momentarily pulling the reset line 40 to a logic low to initialize the microprocessor 32 and reset memory for receiving a new message. The incoming analog signal which, for purposes of illustration is described as an audio message, is transmitted to the analog-to-digital conversion circuit of the microprocessor 32 through the input audio coupling 96. After conversion of the analog signal to digital format, the converted signal is then conveyed to the RAM 78 for storage in memory. When reception of the analog signal ceases, the enable or decoder 16 terminates the logic high which activates the trailing edge detector 42, bringing it to a logic low. The logic low is indicated to the logic invertor 46 through the line 44, and the logic invertor inverts the low to a logic high which is conveyed through the stop line 48 to the microprocessor 32 to terminate the conversion and record process. Termination of the logic high also returns the start line 30 and the record/play line 31 to their original standby logic low condition, placing the system 10 in a standby mode in which very little power is required.

To retrieve and play back a digital message stored in RAM 78, the receiver operator activates the playback switch 58 to cause the switching controller 60 to issue a logic high through the line 160, logic blocking circuit 100, the line 104 and the start line 30 to the microprocessor 32 to activate the playback reproducing function.

At the same time, the switching controller 60 outputs a logic high through the line 102 to simultaneously close the switches 62, 66. The signal, which has been reconverted to analog format, is directed from the microprocessor 32 by the line 98 through the audio switch 66 and output audio coupler 95 to the amplifier means 24 (shown in FIG. 1). Upon completion of the message reproduction and playback, the microprocessor 32 sends a logic high through the line 110 to the reset switch 108. The reset switch 108 resets the switching controller 60 to its original condition, returning its output to a logic low and which returns the switches 66, 62 to the open position. At this point, the system 10 is in the standby mode and ready to receive a new incoming signal for conversion and storage.

In the embodiment of the invention thus far described, it will be understood that there are no means for protecting a message in memory, and, upon receiving an incoming properly addressed signal, the system is automatically reset, and the incoming signal will be converted and stored over any message or data already in memory. The system 10, however, is readily adapted for the storage of a sequence of messages in memory and protection of stored messages by selective reset circuitry or manual reset circuitry which must be activated to initiate the message record and conversion mode after memory is full of unplayed messages or data.

As shown in FIG. 2, assuming that the leading edge detector is removed from the system 10, and the reset switch 38 is manually activated to reinitiate the microprocessor 32 in the manner already described to reset memory for recording over material already stored in memory. The system 10 requires no further reset in order to record multiple messages until the respective memory bank is full, at which time a stop enable is generated within the microprocessor 32 and memory for that bank is protected until reset. As illustrated most clearly in FIG. 3, a memory address selector or message counter 50, which is a standard 4-bit code counter circuit, is connected to the microprocessor 32, making possible the selection of 16 different 4-bit address combinations per bank. It will be understood, however, that other address selector circuits may be employed, such as 2-bit counter circuits or manual selectors, as are well known in the art. The message address selector 50 is connected to the start line 30 for receipt of the logic high from the logic blocking circuit 56c.

A manual reset switch 75 is provided for resetting the message address to its initial address setting for the playback of messages stored in the memory. Playback of messages occurs in the manner already described except that, with the leading edge detector 36 out of the circuit, the reset switch 38 must be manually activated to discharge the reset line 40 in the manner already described to reset the microprocessor 32 for receiving new incoming analog signals and recording over messages already in RAM.

In an alternative form of the invention, the system 10 may optionally employ a timer 52 in place of the trailing edge detector 42. The use of a timer is particularly required when the decoder or enable 16 is of the type which emits a single pulse in response to a properly addressed incoming signal.

Figure 3:
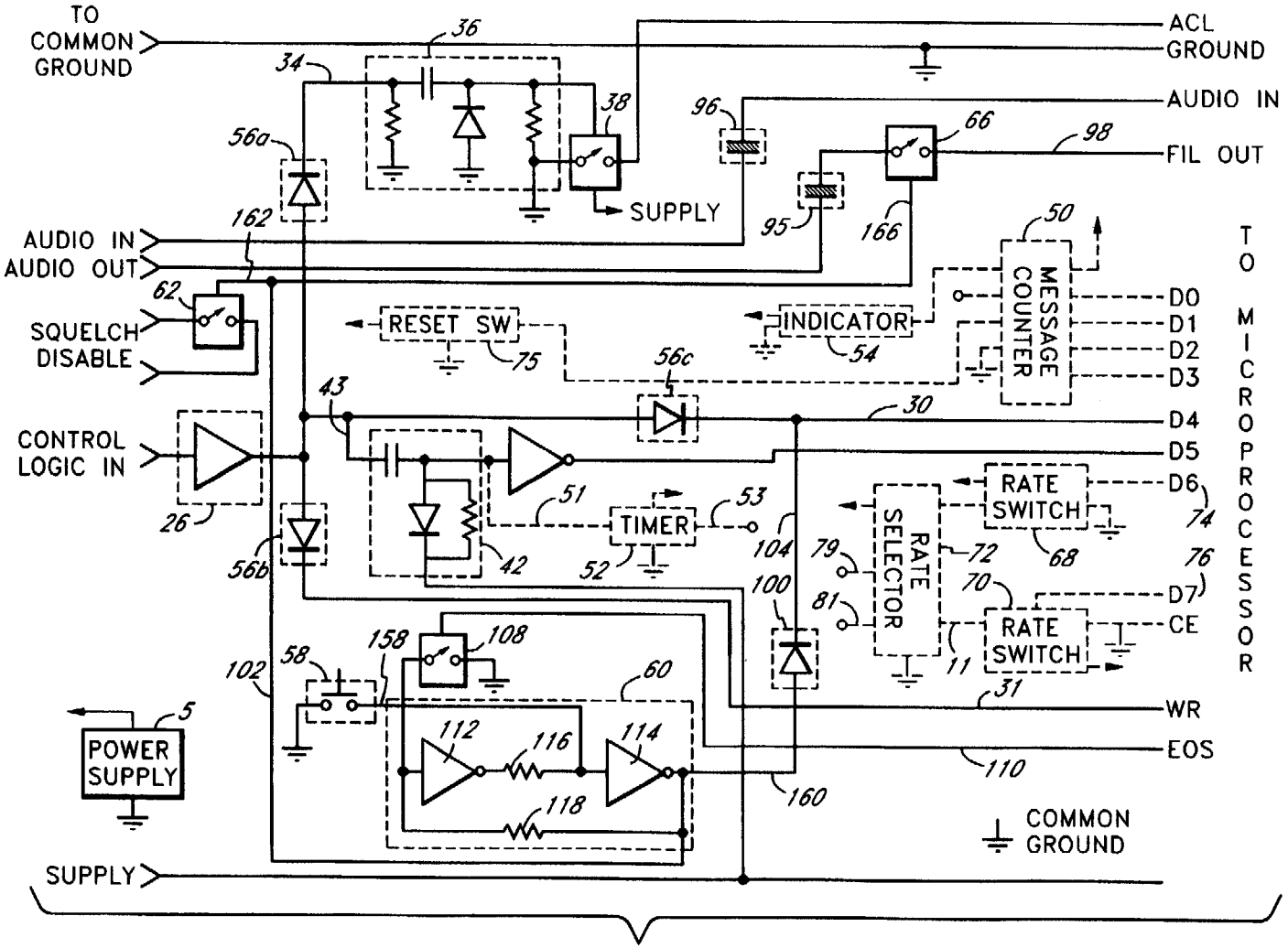
FIG. 3 is a schematic diagram showing the switching circuit of FIG. 2 in more detail.

As illustrated in FIG. 3, the trailing edge detector 42 and the line 44 are eliminated from the circuit, and the timer 52, of conventional design, is connected by a line 53 to the line 43 for receiving the logic high from the input logic buffer 26. In operation, the timer 52 is initiated by the logic high and, upon expiration of a preset period of time, issues a negative pulse to the logic invertor 46 (FIG. 2) which issues a logic high to the stop line 48 (FIG. 2) to place the system 10 in the standby mode in the manner already described.

As illustrated in FIG. 2, the system 10 may also include a message indicator M which signals the arrival of a signal and which may also indicate that memory space is full. The message indicator 54 may be a light, LED or a device for creating an audible tone. Such devices are well known in the art and do not, per se, form a part of this invention.

The embodiment of the system 10 illustrated in FIGS. 2 and 3 also optionally includes record/playback rate circuitry which enables the system to receive, convert and record messages at a 1-bit rate and playback the messages at a different bit rate. The maximum rate in BPS is determined by the particular microprocessor employed in the system and in the embodiment described herein the maximum rate is 32K BPS.

Figure 4:
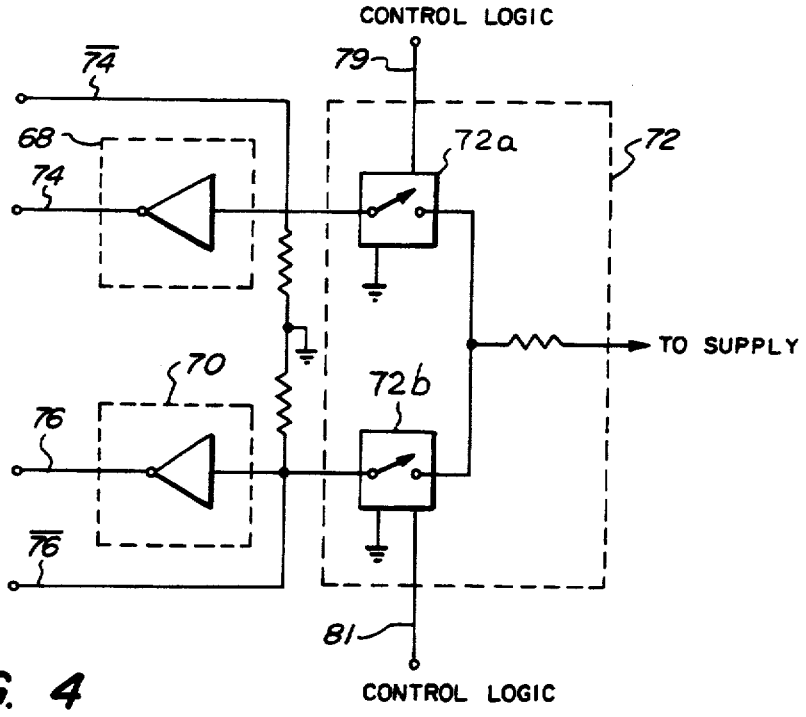
FIG. 4 is a schematic diagram of a portion of the switching circuit of FIG. 2, illustrating the message rate control circuitry.

As is most clearly shown in FIG. 4, the rate circuitry includes invertors 68, 70 which are connected to the microprocessor 32 by lines 74, 76, respectively. A rate selector 72 which includes rate selector switches 72a, 72b is connected to the invertors 68, 70. The rate selector 72 may be connected to the output of the switching controller 60 at line 160 by lines 79 or 81 for control of playback speed.

As illustrated, the rate selector switches 72a, 72b are both open producing low input and high output at invertors 68, 70 so that both lines 74, 76 are high. In this condition, the microprocessor will record and play back at the same rate of speed, in this case 32K BPS. When the playback switch 58 is closed, the high output from the switching controller 60 passes through the line 79 to the rate selector which activates and closes rate selector switch 72a which causes a high input at invertor 74. In this configuration, the output of the invertor 30 68 is low, causing line 74 to be low while the output at the invertor 72 is high, causing line 76 to be high. In this configuration, the microprocessor will play back messages at a rate of 16K BPS. The bit rate output is selected by 2-bit codes so that four rates are selectable, depending upon the positioning of the rate selector switches 72a, 72b.

The operational mode of the system 10 can be manually controlled to allow the receiver operator to play back messages and to interrupt the playback at any point to return the system 10 to the standby mode for receiving additional messages or data.

Figure 6:
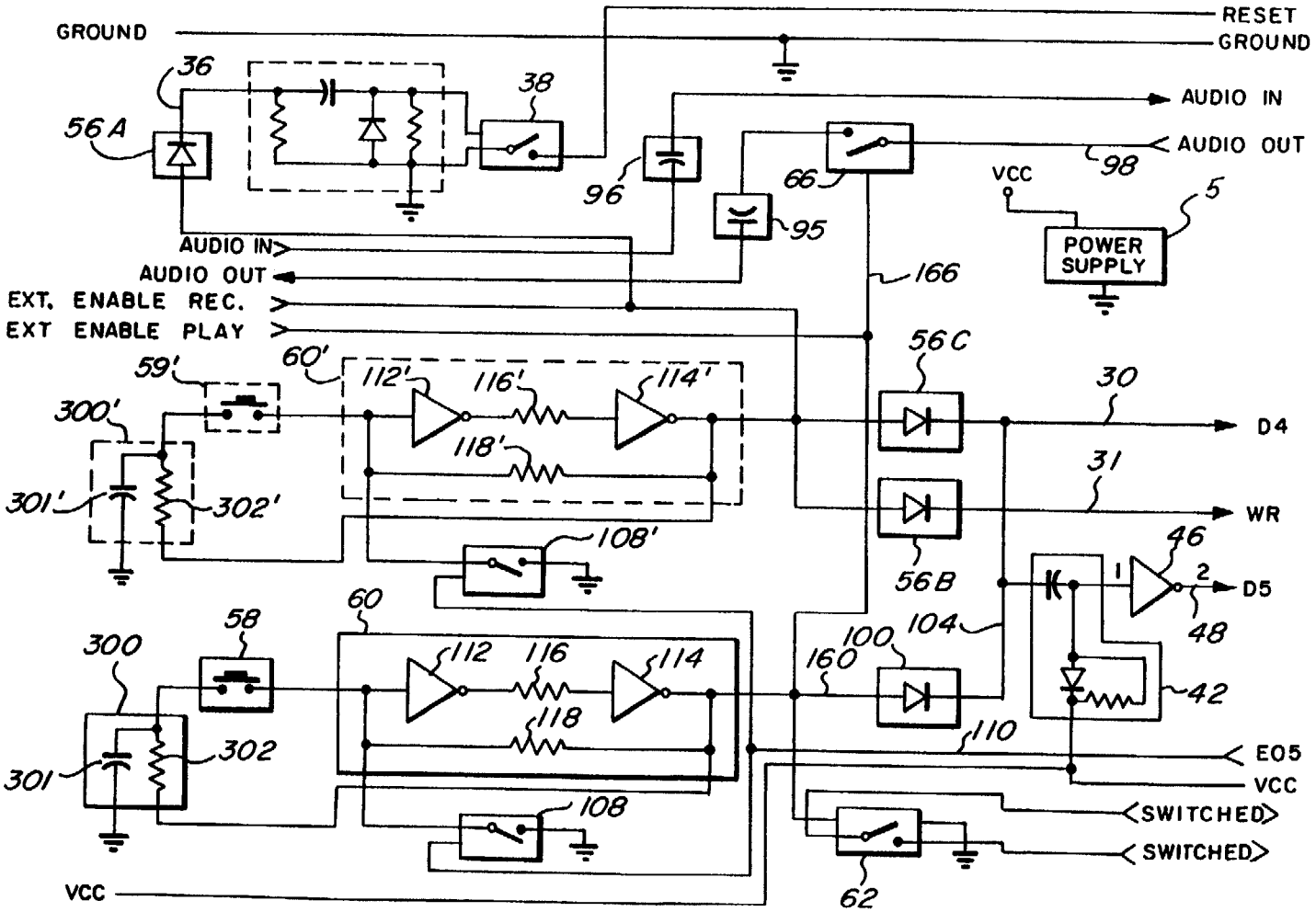
FIG. 6 is a schematic diagram ofthe switching circuit of FIG. 2, illustrating circuitry for the manual activation of the record function.

Referring to FIG. 6, a capacitive memory circuit 300 of typical design is composed of capacitor 301 and resistor 302. The capacitive memory circuit 300 is connected to the playback switch 58 and switching controller 60 in a manner to cause the output of the line 160 to change state with each momentary closure of the switch 58. When the playback switch 58 is closed, the line 160 of switching controller 60 becomes high, distributing a logic high on the line 104 and the line 30 to the microprocessor 32 (not shown) to activate the system to the playback mode. A second closure of the switch 88 produces a high-to-low line transition which is conveyed to the trailing edge detector 42. The trailing edge detector initiates a signal to the logic invertor 415, which inverts the signal to a logic high, which is conveyed through the stop line 48 to the microprocessor to terminate the record and data conversion mode and to return the system 10 to the standby mode in the manner described above.

As mentioned, the system of the present invention lends itself to use as an "electronic scratch pad" so that an operator may dictate messages into memory, either for playback by the operator or for later broadcast where the system is employed in two-way communications. The manual record feature is provided by a second capacitive memory circuit 300′ which is connected to a manual record switch 59, a second switching controller 60′ and a second reset switch 108′. As is shown, the manual record circuitry is the complement of the manual playback circuitry. However, closing the manual record switch causes the switching circuit to issue a high signal through the line 34 to the leading edge detector 36 which in turn initiates a pulse, causing the microprocessor to be initialized for receiving a message, as previously described. The message is entered through the microphone 17 (FIG. 1) which communicates with the control circuitry 18.

Figure 7:
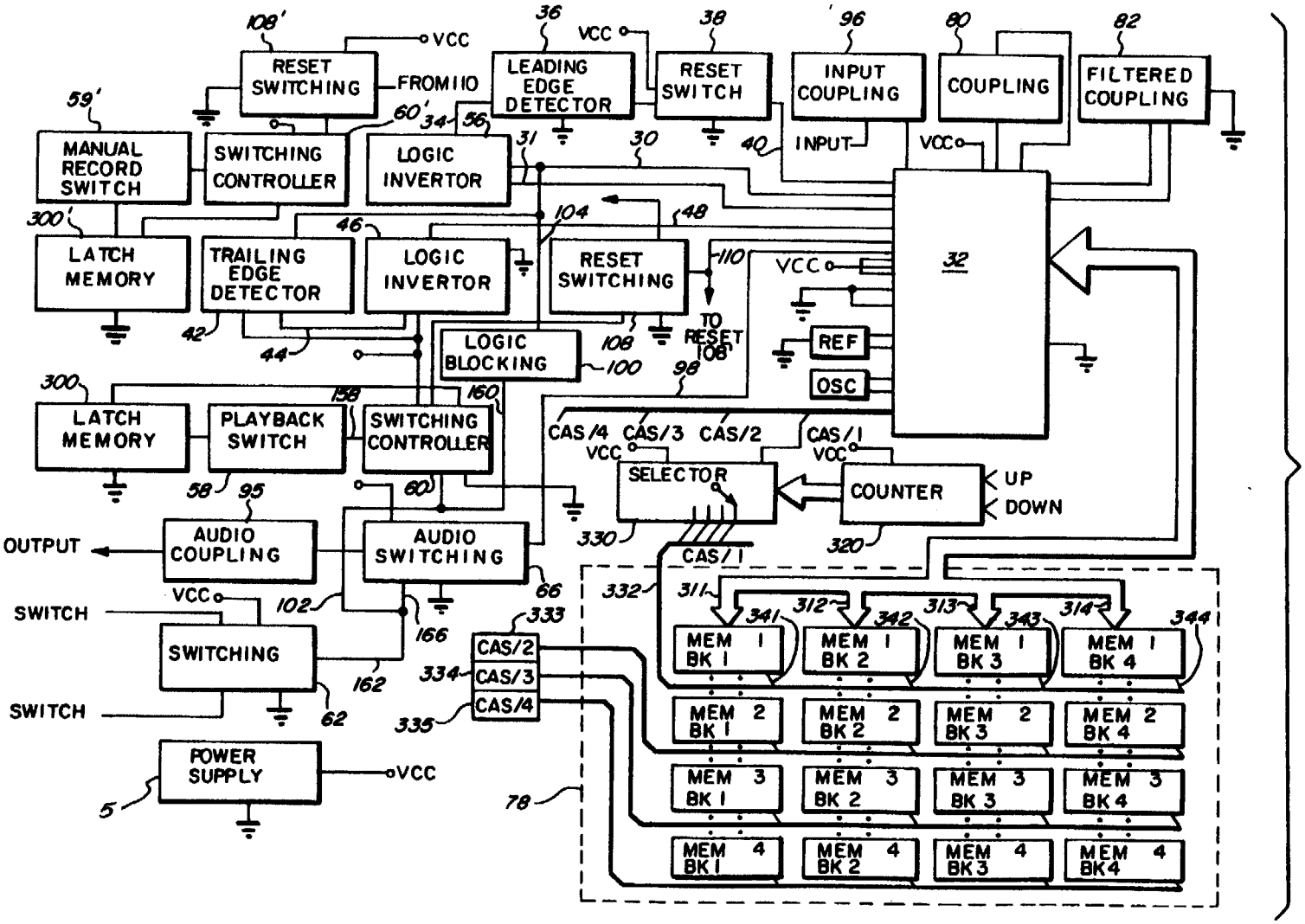
FIG. 7 is a schematic diagram illustrating the circuitry of FIG. 2 with increased Random Access Memory (RAM).

FIG. 7 shows a block diagram of the preferred configuration of the RAM 78 of the system 10. The RAM 78 comprises four banks, 311, 312, 313 and 314, each comprising four RAM chips of conventional design. It will be understood, however, thai additional RAM banks may be added to increase memory capacity as well as adding additional RAM chips to the RAM banks. A counter circuit 320 and a RAM bank selector 330 are provided for addressing incoming data and messages to RAM and for recalling stored material from RAM.

The counter circuit 320 illustrated is an up-down counter with a binary output coupled to the bank selector 330. The bank selector 330 is connected to lines CAS 1 (bus 332) of the microprocessor and by lines 341, 342, 343, 344 to the RAM banks 311, 312, 313, 314, respectively. Additional CAS buses 333, 334, 335 may be configured in the same manner as CAS 1 (bus 332) to additional RAM bank selectors for the expansion of memory.

In a preferred embodiment, the counter 320 is configured in a manner that produces an up count responsive to the record and conversion mode, and a down count responsive to the playback functions. In such a configuration, the last message recorded is the first message reproduced during playback. Thus, during the record and convert operation, the counter 320 receives a pulse from the control circuitry 18 (FIG. 1) at the initiation of the record and conversion mode, which causes the counter 320 to count up in binary code responsive to each pulse received. The count, in binary code, is conveyed to the bank selector 330, and, responsive thereto, the bank selector 330 selects the first RAM bank 311, followed by the second RAM bank 312 with each count from the counter 320. At the initiation of the playback mode, the counter receives a pulse at the down input terminal which causes the counter to count down in binary code which is conveyed to the bank selector 330. RAM bank selection for playback begins with the last RAM bank to receive a message. During the record or the playback functions, the GAS 1 (bus 332) of the microprocessor 32 is switched to the designated RAM bank.

In operation, multiple messages may be stored in each memory of each bank. The microprocessor utilized may be of the static or the dynamic type. It is preferred that the static version of the microprocessor be configured with a static version of RAM, and that the dynamic version of the microprocessor be configured with a dynamic version of RAM.

Figure 5:
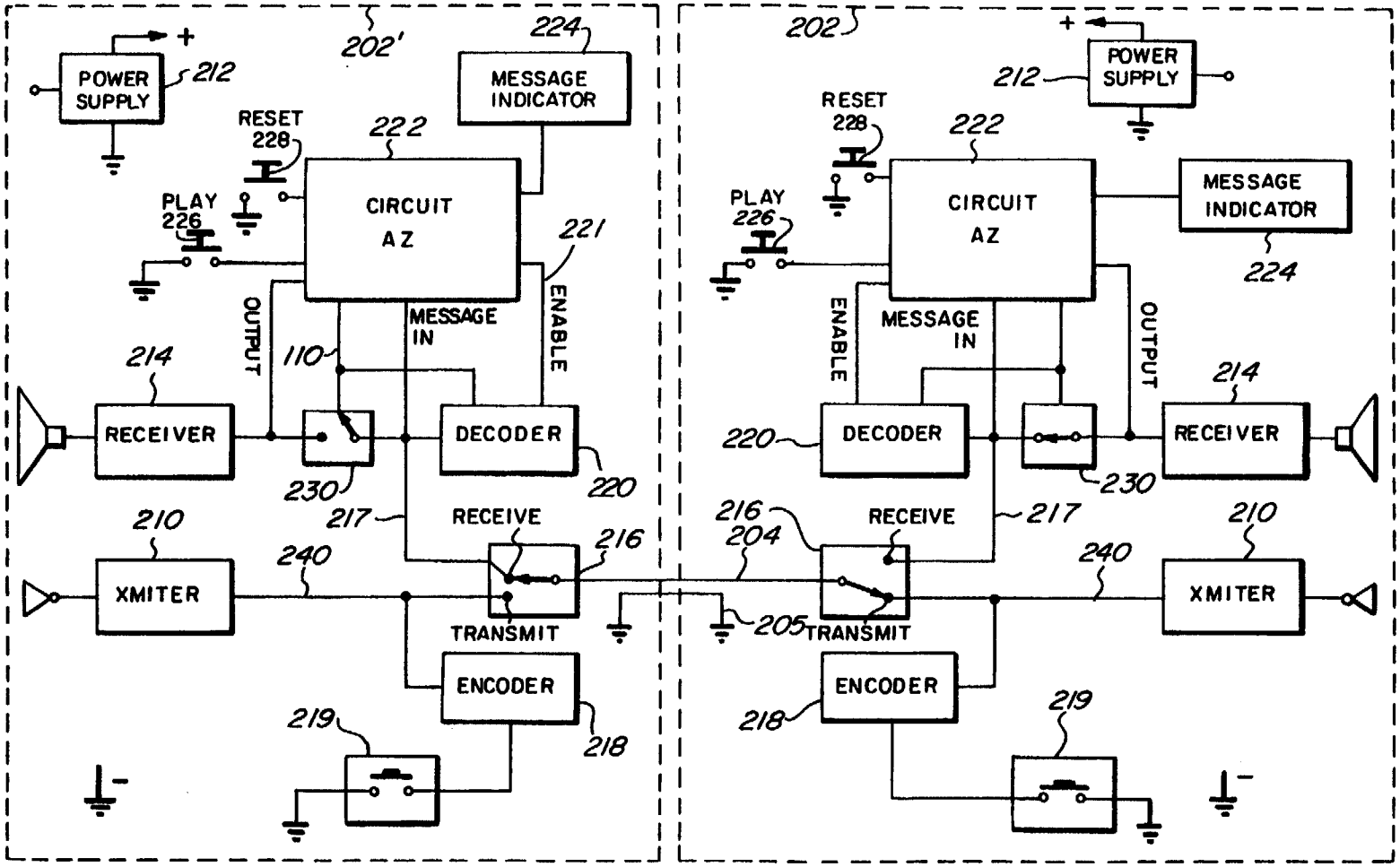
FIG. 5 is a block diagram of an intercom system utilizing the voice storage memory system of the present invention.

Referring now to FIG. 5, there is illustrated a telephone system incorporating an analog-to-digital data storage system in accordance with the invention. In the embodiment illustrated, two transmitters/receivers (shown generally as 202 and 202') are connected by a wire 204 and a common Found 205 for intercommunication. Each transmitter/receiver 202, 202' includes a power supply 212, as in the case of a conventional telephone. A send/receive switch 216 (push to talk) is provided in each transmitter/receiver 202, 202' for making the transmitter circuit during transmission and for breaking the transmitter circuit 222, and completing the circuit to the receiver 214 during reception of a message. It will be understood that the send/receive switch 216 is provided for illustration purposes only and that full duplex intercom systems, telephone systems and telephone intercom systems are available which do not require such a switch for operation of the intercom or telephone system.

An encoder 218 and encoder switch 219 are connected into a line 240 to a transmitter 210. The encoder 218 may be of any of the types previously discussed and preferably would be of the DTMF type as used in most telephone systems. The receiver transmitters 202, 202' also include a decoder 220 which is connected to an analog-to-digital data storage system 222 of the type previously described in connection with FIGS. 1, 2 and 3 above. The transmitters/receivers 202, 202' both include a message indicator 224 which is activated to indicate that a message has been received and placed in memory. A playback switch 226 and a reset switch 228 are provided for each of the circuits 222, and a private switch 230 serves to switch the receiver 214 of the transmitters/receivers 202, 202' out of the circuit so that messages being recorded cannot be heard while being recorded. The playback switch 226 may be replaced with an extra enable output (not shown) so that the playback function would be activated by entering a personal identification code through the keypad of a telephone (not shown).

The operation of the intercom system is illustrated in FIG. 5, with the transmitter/receiver 202 set to transmit with switch 216, completing the circuit between the transmitter 210 of transmitter/receiver 202 through the wire 204 to the receiver 216 of transmitter/receiver 202'. The transmitter/receiver 202' is in the receive mode with its transmit/receive switch 216 completing the circuit from the wire 204 to the analog-to-digital storage circuit 222 via line 217. To send a message from transmitter/receiver 202 to transmitter/receiver 202' for recording, the sender activates the encoder switch 219 of transmitter/receiver 202 to activate the encoder 218, which issues a code for transmission to the transmitter/receiver 202'. As mentioned above, the encoder switch 219 will preferably comprise the keypad of the telephone or similar device so that the sender can input a preprogrammed code for the transmitter/receiver 202'. Transmitter/receiver 202' is set for reception with the transmit/receive switch breaking the transmitter circuit and making the receiver circuit. As illustrated, the privacy switch 230 is in the open position so that the messages received at the circuit 222 are not played back through the receiver 214, but are recorded only in the manner described hereinafter.

The enable or decoder 220 senses the message address and, if addressed to receiver/transmitter 202' issues the logic high which is transmitted to the data storage circuit 222 through the enable line 221 which activates the circuit 222 in the manner described in conjunction with FIGS. 2 and 3. Conversion and recording of the analog message to digital form is carried out by the circuitry 222 in the manner described above in conjunction with FIGS. 2 and 3. At the end of the message, line 110 returns to its normally high state, and switch 230 is closed to remake the receiver circuit. A message may be played back by activating the playback switch 226 which initiates the playback circuitry so that messages in the memory are reconvened to analog form and output to the receiver 214.

It will be understood that a message may be stored in the transmitter/receiver 202 or 202' from any remote unit so long as the user of the remote unit is provided with the proper code to activate the enable or decoder 220. As previously mentioned, it will be understood that the transmitter/receiver 202, 202' may comprise two-way radios or other wireless transmitters/receivers such as those operating optically and the voice storage system 10, as illustrated and described in connection with FIGS. 1, 2 and 3, and may be readily installed in such transmitters/receivers.

Figure 8:
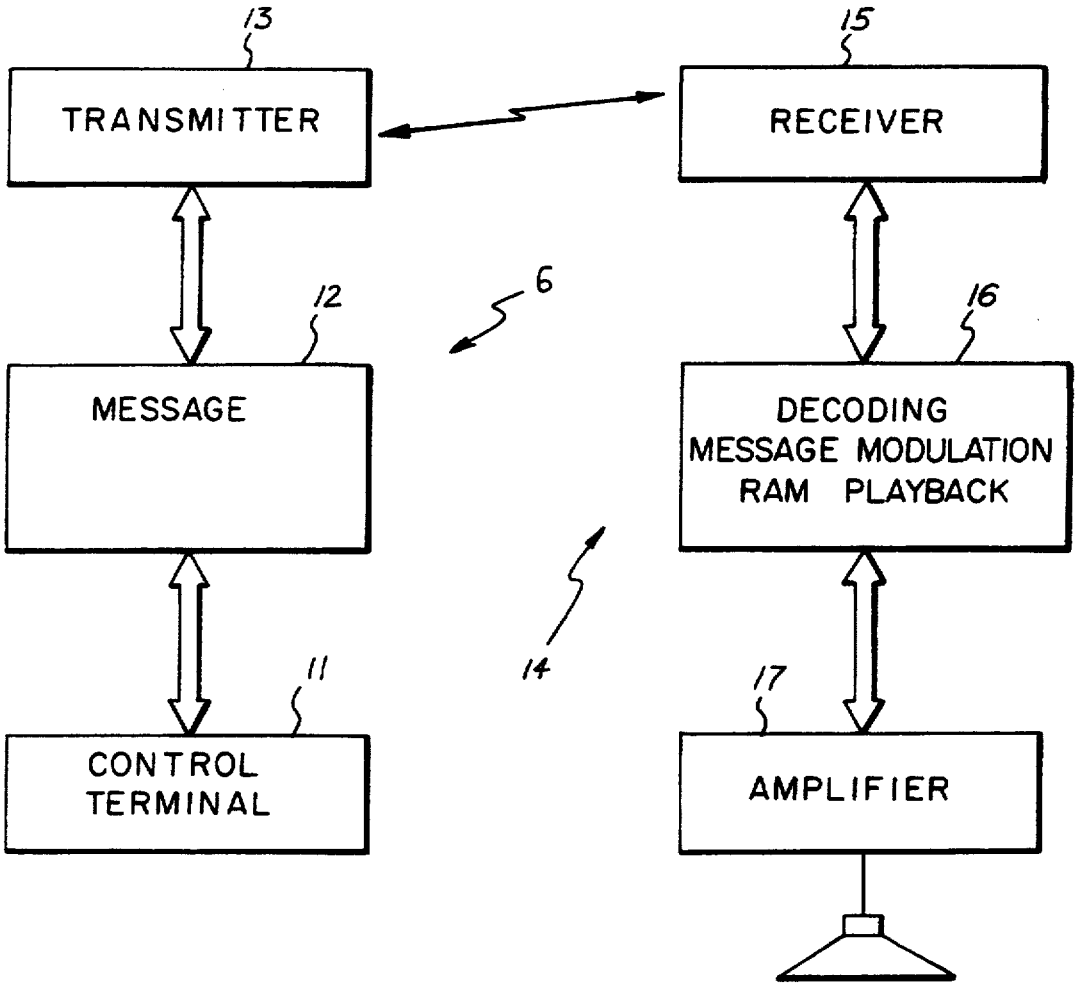
FIG. 8 is a block diagram of an analog message paging system incorporating the variable rate transmission and playback future of the present invention.

Referring to FIG. 8, there is illustrated an analog communications system for the transmission of data in analog form at one rate for reception and playback of the message at a different rate. The system includes a transmitter group 10 consisting of a control terminal 11 for the input of data including address data and message transmission rate data, message modulation and code generation means 12 and transmitter means 13. The data is input from the control terminal 11 to the message modulation and code generation means 12 where the input message is stored temporarily, the address and speed rate code data generated and the analog message modulated to the selected transmission rate. A transmission packet consisting of the modulated analog message. and preceded by an address code and code for controlling the storage and playback rates of the message are sent to the transmitter means 13 for transmission. The transmitter means 13 may be wireless such as, for example, transmission at radio frequency, infrared, or visible frequencies or hard wired, such as by telephone.

The transmitted data is captured by the receiver group 14 which includes receiver means 15 capable of receiving the signal from the transmitter means 13. The signal as received is conveyed to decoding and modulation means 16 including means for processing the record and playback rate codes after the transmitted address code is compared with a preprogrammed address code. If the transmitted address code data matches the preset address code of the receiver group 14, the rate code is input into a rate memory for subsequent control of the record and reproduction rates. The receiver group 14 further includes amplifier and speaker means 17 for the playback of recorded data.

The coding, decoding and signal modulation including message rate conversion functions for both the transmitter group 10 and the receiver group 14 are the same except that the signal input and the control commands for the transmitter group is derived from the control terminal 11 while the signal input for the receiver group is derived from the receiver 15 and the control commands from the circuitry of the decoding and modulation means 16. The encoding and decoding circuitry of both the transmitter group 10 and the receiver group 14 are of conventional design and do not per se form a pan of this invention. Thus, various code generators such as, for example, digital code generators, tone code or dual-tone multifrequency (DTMF) code generators are used with good results. It is critical only that the decoder circuitry of the receiver group 14 be compatible with the code generator circuitry of the transmitter group 10. As mentioned, the transmitted code may include an address which is input from the control terminal 11 so that the message is received and stored at a particular designated receiver group 14. However, the use of an address code with the transmitted signal is not critical and the receiver groups 14 can function with simply voice actuated devices which activate the record circuitry of the receiver group 14 as will be described in more detail hereinafter.

Figure 9:
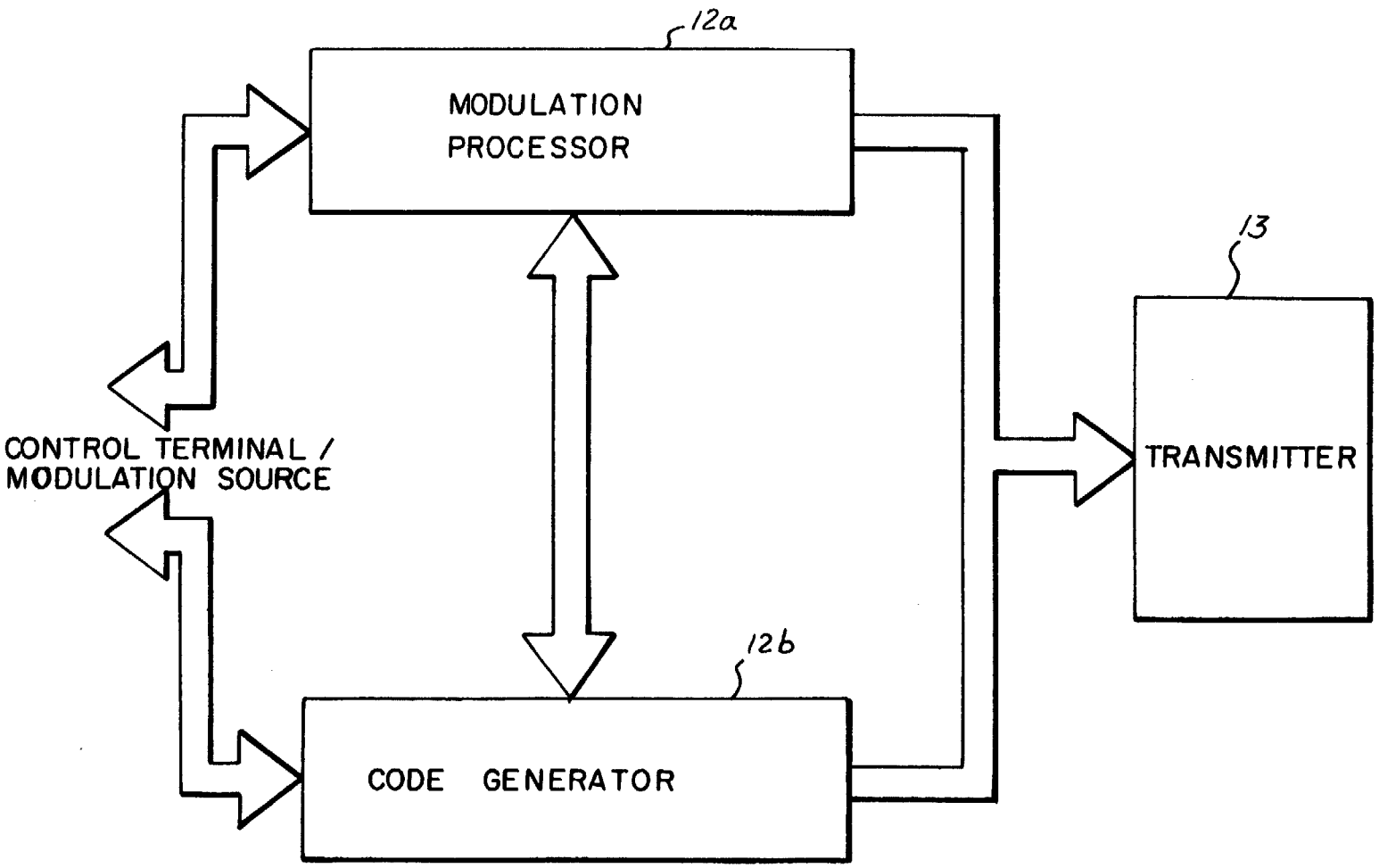
FIG. 9 is a block diagram of the transmission group in accordance with the present invention.

The operation of the transmitter group 10 is best understood in conjunction with FIG. 9 in which the message modulation and code generation circuitry 12 is shown schematically as comprising circuitry for a message modulation processor 12a and a code generator 12b. The control terminal 11, which may be a computer with a number of paging messages in queue, issues an analog message to the modulation processor 12a and the address and rate codes to the code generator 12b. The message is held in the modulation processor 12a while the code generator 12b generates the proper todd for the record and playback rates and issues it to the transmitter for transmission. The control terminal 11 also issues a command to the modulation processor which determines the rate at which the analog message is transmitted and immediately following the transmission of the address and rate codes, the analog message is conveyed to the transmitter at the designated rate for transmission. Thus, the modulation processor 12a operates as a rate conversion circuit. As is shown most clearly in FIG. 10, the receiver group 14 receives the transmitted address code at the receiver 15 and conveys it to the decoder circuitry 16b which issues an activation command to the modulation processor 16a if the address codes match. The decoder circuitry 16b also sends a signal corresponding to the record/play rate command to the modulation processor circuitry 16a for control of the record/play rate. The transmitted analog message signal is conveyed to the modulation processor 16a from the receiver 15 where the data is preferably converted to digital format and stored in memory. Upon activation of a playback function by tile receiver group operator, the stored playback rate command is issued by the decoder 16b in the manner to be described hereafter and the message is recalled from memory, reformatted into analog format and replayed at the command rate through the amplifier and speaker means 17.

The decoder 16b may be preset to issue a fixed record and playback rate code such as is the ease where messages are always transmitted at the same rate so that the record and playback rate can be fixed. However, for maximum flexibility it is preferred that the decoder 16b be adapted to issue different record and playback rate codes so that the same receiver group can receive, record and playback separate messages which have been transmitted at different rates.

The circuitry of the modulator processor 12a of the transmitter group 10 and the modulator processor 16a of the receiver group 14 is very similar and operates in substantially the same manner whether it is being used for transmitting or receiving. The circuitry essentially performs three functions; circuit control and switching, memory and signal conversion. As shown in FIG. [4] *11* the modulation processor circuitry includes memory 22, control circuitry 18 for carrying out switching, reset and control functions responsive to control logic commands. Signal convertor circuitry 20 may be optionally included to convert data contained in the signal from analog to digital for storage and from digital to analog for transmission or playback.

Figure 10:
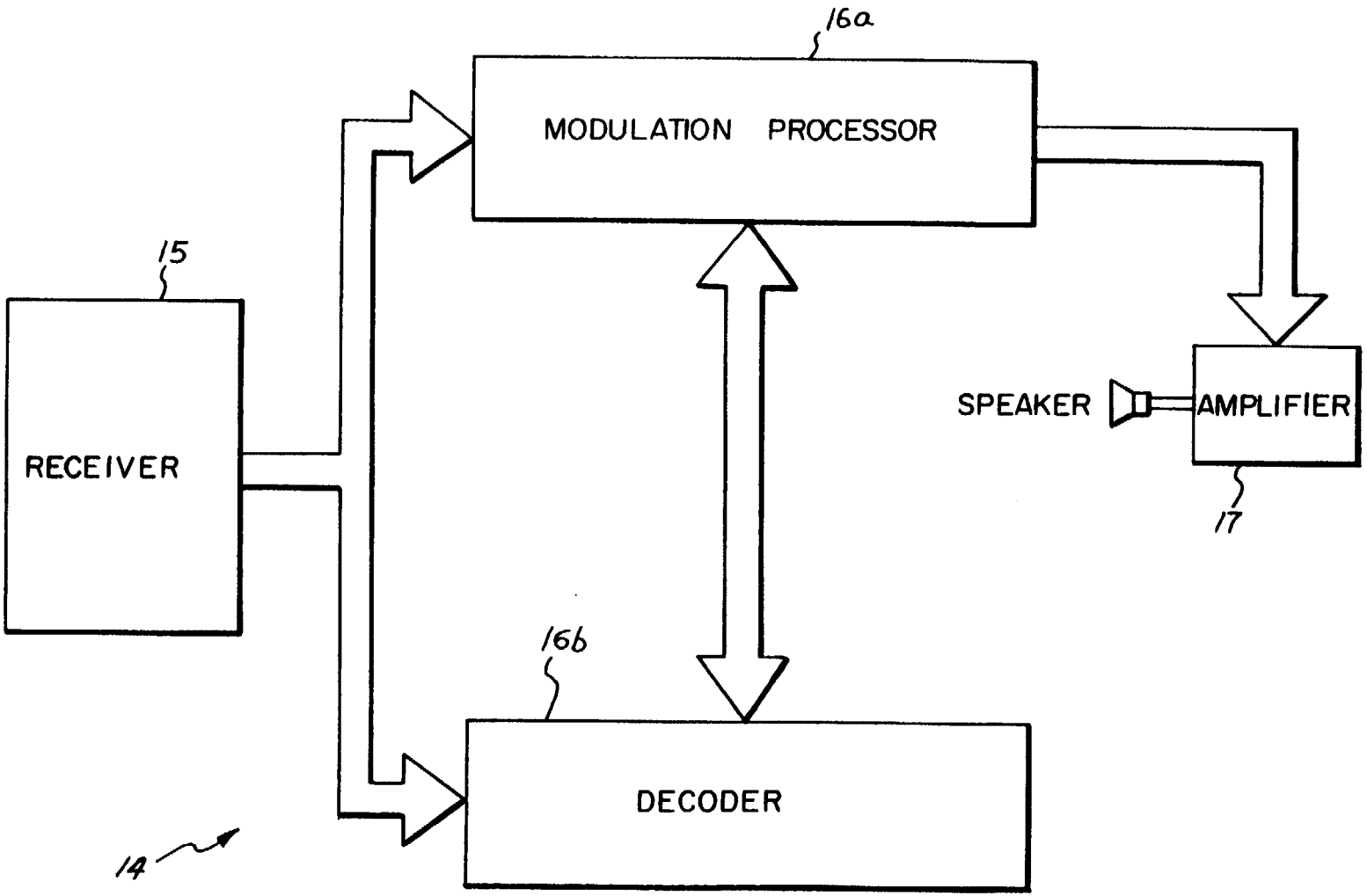
FIG. 10 is a block diagram of the receiver group in accordance with the present invention.
Figure 11:
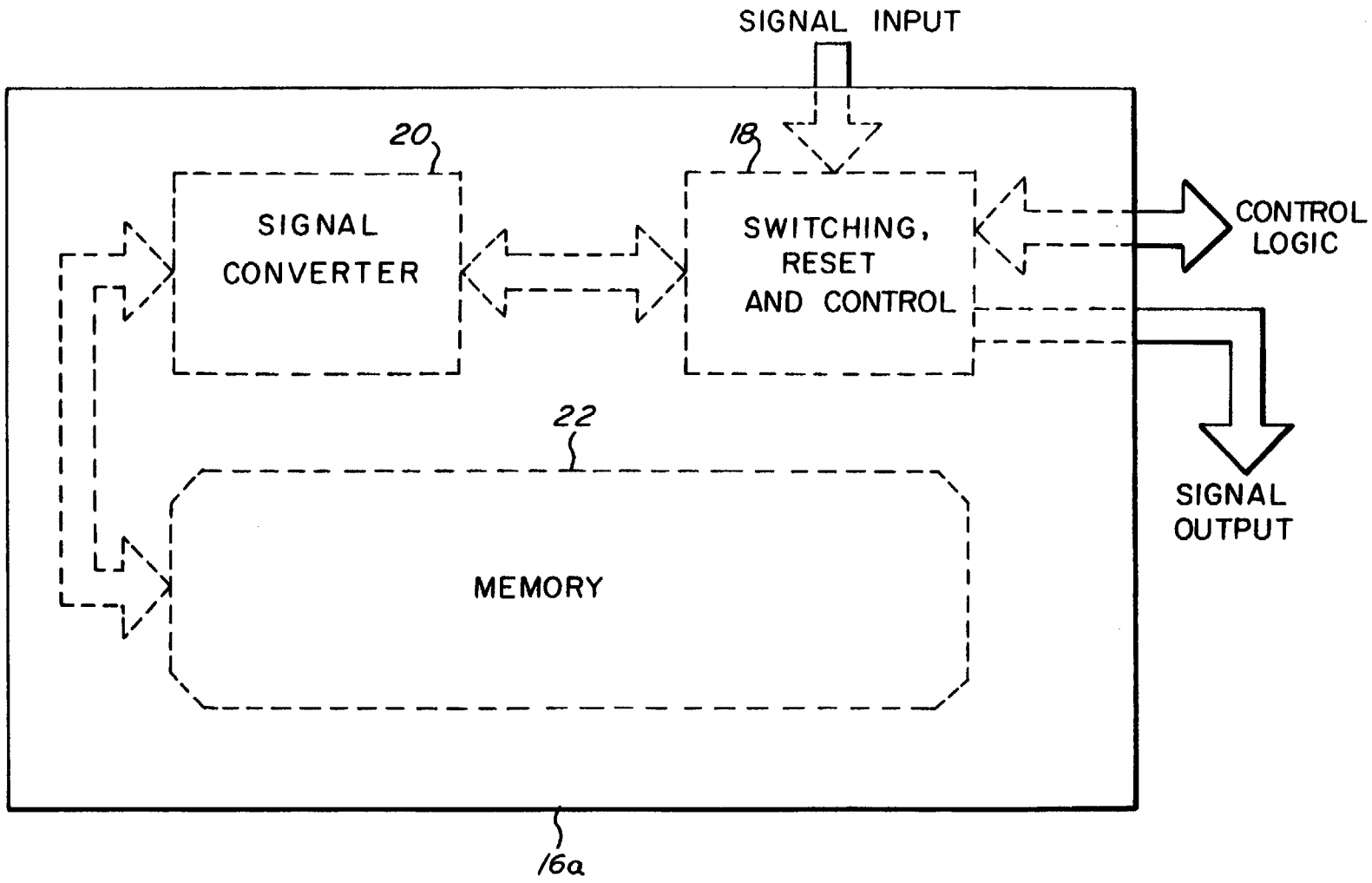
FIG. 11 is a block diagram of the modulation processor circuitry utilized by both the transmitter group and the receiver group.
Figure 12:
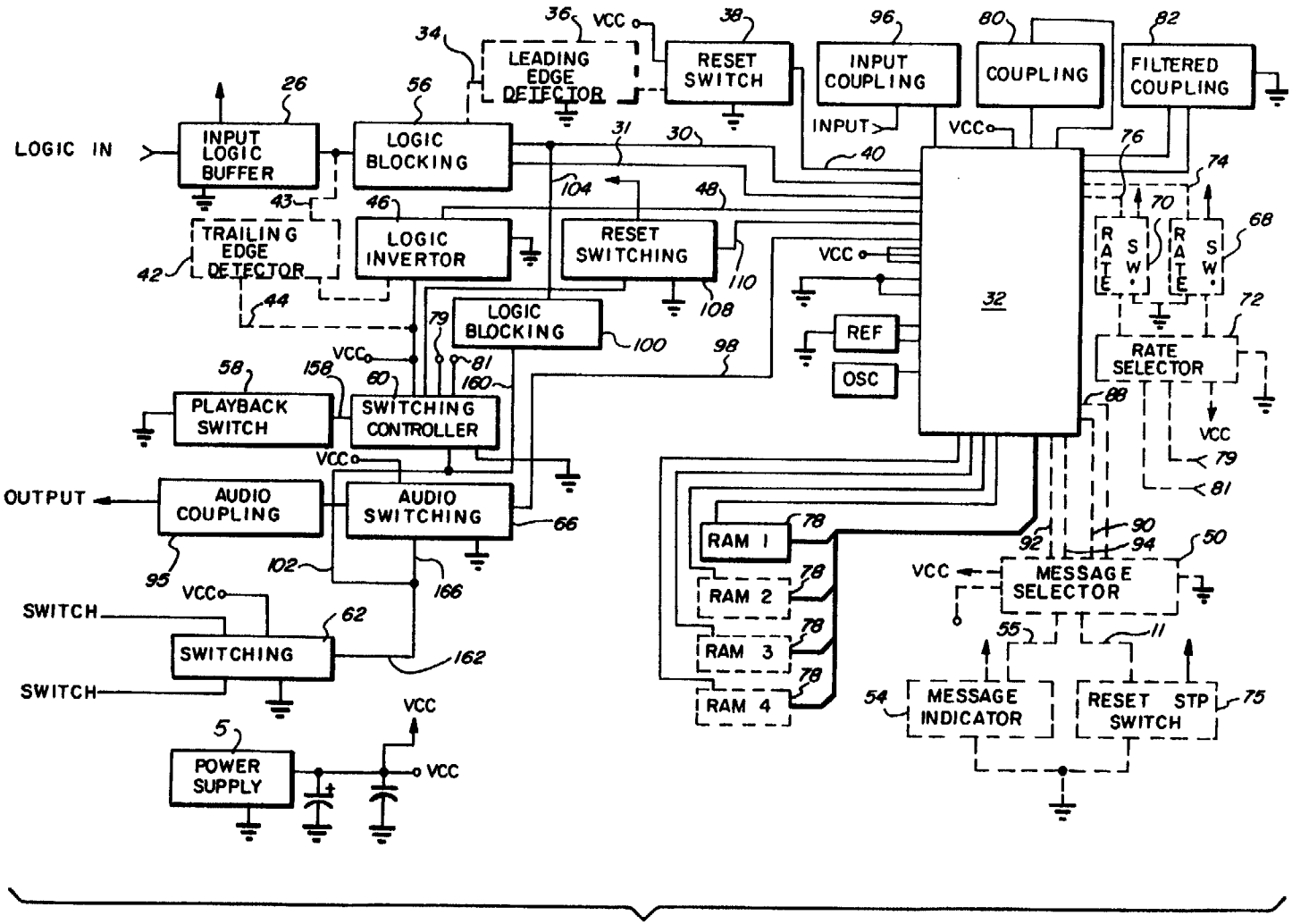
FIG. 12 is a block diagram of the circuitry of the modulation processor.
Figure 13:
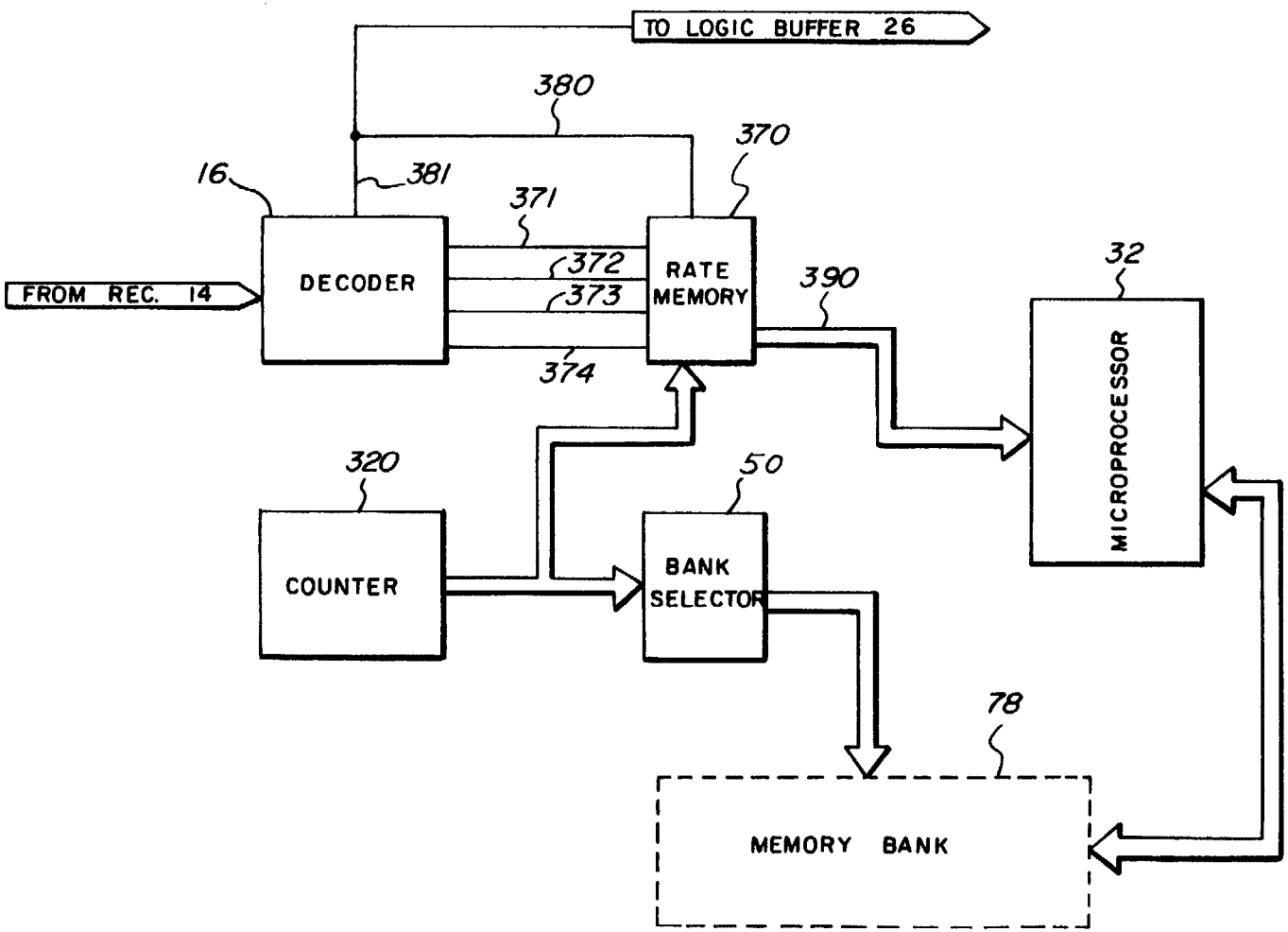
FIG. 13 is a block diagram of the receiver group decoder circuitry.

Referring now to FIGS. 12 and 13, there is shown a block diagram of the circuitry utilized in the control means 18, signal conversion means 20 and memory means 22 of the modulator processor circuitry 12a and 16a illustrated in FIGS. 9, 10 and 11. The term audio will *used* used throughout to designate the data being processed but it will be understood that the invention is not limited to the transmission of audio messages only and other data types and playback forms are used in the system as well.

As illustrated in FIG. 12 and FIG. 13, certain features which are present in the modulator processor circuitry 16a of the receiver group 14 and which are not utilized in the modulator processor circuitry 12a of the transmitter group 10 are shown in phantom. The following description of the modulator processor circuitry will be in connection with the modulation processor 16a of the receiver group 14. However, it will be understood that unless otherwise specified, the description will apply equally to the circuitry of the modulation processor 12a of the transmitter group 10.

A power supply 5 comprises any suitable source of power and preferably has a potential of at least 3 volts. Output from the decoder 16b to the control circuitry is through an input logic buffer 26 to a logic blocking circuh 56. The logic blocking circuit 56, which is of conventional diode design, distributes an enable signal (logic high) through a start line 30 and a record/play line 31 to a microprocessor 32. In the receiver group 14, if the decoder 16b is of the type that issues a continuous logic high during the duration of the incoming analog signal, it is highly preferred to include circuitry for automatically returning the circuits to the standby mode upon completion of the analog signal as indicated by a termination of the logic high. For this purpose, a trailing edge detector 42 is connected to a logic invertor 46 which in turn is connected to the microprocessor 32 through a stop line 48, the purpose and operation of which will be described in more detail hereinafter. In the case of the transmitter group 10 such circuitry is unnecessary since the control of the switching circuits is by the control terminal.

The incoming analog signal is input to the microprocessor 32 through an analog input coupling (audio coupling) 96 of conventional design. An audio switch 66 is connected to the microprocessor 32 by a line 98 for monitoring the analog signal during the record mode. For automatic resetting of the system to permit recording over messages already in memory, there may be included a leading edge detector 36 to which the logic high is conveyed from the logic blocking circuit 56 by means of a line 34. The leading edge detector 36 is of conventional design and is connected to the microprocessor 32 through a reset switch 38, and a reset line 40. A phyback switch 58 is connected to a switching controller 60. The switching controller 60 consists of a pair of invertors which axe coupled by resistors in a bi-stable (two stable states) circuit of conventional design whose output at lines 102 and 160 is normall low until inverted by activation of the switch 58 to initiate the playback mode. The output of the switching controller 60 remains high until it is inverted to its normal low by a reset switch 108. In the transmitter group 10, the function of the playback switch is taken over by the terminal controller 11.

It is highly preferred to store data in the memory 22 in digital form in order to conserve space. This paniculaxly is the case for the receiver group 14, although conservation of memory space can be of great importance in the transmitter group 10 as well. Accordingly, in the discussion that follows, the modulator processor circuitry will be described as including the signal converter circuitry 20 although it is not critical to the operation of the modulation processor circuitry.

The digital to analog conversion and analog to [10] digital reconversion is accomplished by the microprocessor 32. The microprocessor 32 is of conventional design, such as the microprocessor manufactured by Toshiba under the model number T6668, and is provided with circuitry for converting analog to digital and reconverting digital to analog. Such conversion circuits are well known in the an and operate by generating an internal time base, sampling the analog signal input at some predetermined point in each of the time base segments, and then generating a digital output responsive to the sample level obtained during the sampling period.

The microprocessor 32 is adapted for communication with random access memory which is illustrated as a bank of four 256K bit chips 78. It will be understood, however, that memory is not so limited and additional banks of RAM chips may be added as desired and as space permits. For example, the microprocessor 32 is readily adapted for communication with a random access memory 78 which consisting of one or more banks of 256K bit chips. Additional memory banks may be added as desired or needed, especially if the receiver operator intends to carry out a substantial mount of message recording, such as where the receiver group 14 is to be used as a note or memo storing unit.

The rate circuitry which enables the system to transmit, receive, record and playback messages at different clocking rates determined by the terminal 11 for the transmission group and by the decoded rate codes at the receiver group is most clearly shown in FIG. 5. The rate circuitry includes rate switches (invertors) 68 and 70 which are connected to the microprocessor 32 by lines 74 and 76 respectively. A rate selector 72 is operated by the output of the switching controller 60 at line 160 by lines 79 and 81 to control playback speed. In the modulation processor 12a of the transmitter group 10, the playback rate, which is the transmission rate, is under the control of the control terminal 11 and thus the invertors 68 and 70 and the rate selector 72 and the associated circuitry are not used.

In its standby configuration, the rate selector switch 72 is positioned to produce a low input and a high output at invertors 68 and 70 respectively so that both lines 74 and 76 are high. In this condition the microprocessor will record and playback at the same rate of speed, in this case 32K BPS. When the playback switch 58 is closed the high output from the switching controller 60 passes through the line 79 to the rate selector 72 which produces a high input at invertor 68. In this configuration the output of the invertor 68 is low eausing line 74 to be low while the output at the invertor 70 is high causing line 76 to be high. In this configuration the microprocessor will playback messages at a rate of 16K BPS. The BIT rate output is selected by 2 BIT codes so that 4 rates are selectable depending upon the positioning of the rate selector switch 72. The maximum rate in BPS is determined by the particular microprocessor employed in the system and in the embodiment described herein the maximtim rate is 32K BPS. Upon completion of the message reproduction and playback, the microprocessor 32 sends a logic high through the line 110 to the reset switch 108. The reset switch 108 resets the switching controller 60 to its original condition returning its output to a logic low and which returns the switches 66 and 62 to the open position. At this point the system 10 is in the standby mode and ready to receive a new incoming signal for conversion and storage.

In operation, the data to be transmitted is input to the memory 22 of the modulation processor 12b of the transmitter group I0 and held pending a transmit command. The transmit command includes an address code and rate code which are sent to the code generator 12b and then to the transmitter 13. Immediately following the rate codes and the transmit commands are sent to the microprocessor 32 and the message is retrieved from memory 22 and played back to the transmitter at the playback rate commanded. Where the signal converter circuitry 20 is employed to store the message data in memory in digitalized format, it will be understood the same circuitry is employed to reconvert the data to analog format before it is conveyed to the transmitter 13.

The analog message, audio or data, is transmitted by the transmitter 13 to the receiver 15 (FIG. 8). The message is preceded by a designated address code of any of the commonly used types such as tone, DTMF, digital, or the like and includes a playback rate code and may also include a length of message code. The analog signal received by the receiver 15 is transmitted to the decoder 16b which, if the proper designated code is present, or if the decoder 16b is a VOX circuit, emits an enable signal (logic high) through the input logic buffer 26 to the logic blocking circuit 56. In the embodiment of the invention described thus far the decoder 16b is of the type which emits a continuous logic high for the duration of the incoming analog signal. The logic high is conveyed through logic blocking circuit 56, the start line 30 and the record/playback line 31 to the microprocessor 32. In addition, the logic blocking circuit 56 conveys a logic high through the line 34 to the leading edge detector 36 which emits a pulse to close the reset switch 38. In the closed position, the reset switch 38 completes the circuit momentarily pulling the reset line 40 to a logic low to initialize the microprocessor 32 and reset memory for receiving a new message. The incoming analog signal, which for purposes of illustration is described as an audio message, is transmitted to the analog to digital conversion circuit of the microprocessor 32 through the input audio coupling 96. After conversion of the analog signal to digital format the conversion signal is then conveyed to the RAM 78 for storage in memory. When reception of the analog signal ceases, the decoder 14 terminates the logic high which activates the trailing edge detector 42 bringing it to a logic low. The logic low is indicated to the logic invertor 46 through the line 44 and the logic invertor inverts the low to a logic high which is conveyed through the stop line 48 to the microprocessor 32 to terminate the conversion and record process. Termination of the logic high also returns the start line 30 and the record/play line 31 to their original standby logic low condition placing the system 10 in a standby mode in which very little power is required.

To retrieve and playback a digital message stored in the RAM memory, the operator activates the playback switch 58 to cause the switching controller 60 to issue a logic high through the line 160, logic blocking circuit 100, the line 104 and the start line 30 to the microprocessor 32 to activate the playback reproducing function. At the same time the switching controller 60 outputs a logic high through the line 102 to simultaneously close the switches 62 and 66. The signal, which has been reconverted to analog format, is directed from the microprocessor 32 by the line 98 through the audio switch 66 and output audio coupler 95 to the amplifier means 17 (FIG. 8).

Referring to FIG. 13 where like numbers refer to like partrs, the decoder 16b is adapted for issuing a different record and playback rate codes for each individual message stored in memory by the provision of rate memory 370 with which the decoder 16b communicates by lines 371–374. The line 371 is the enable line which activates the rate memory 370 to receive the playback rate code output from the decoder 16b through the lines 373 and 374. The playback rate code is stored in a sector of the rate memory 370 designated by the counter 320 which also selects a corresponding sector of the RAM 78 in which to store the message. After the playback rate code is decoded and stored in the memory 370, the line 371 is disabled and the line 372 is enabled. The decoder 16b decodes the record speed rate and this command is coupled to the record rate memory sector of the rate memory 370 through the lines 373 and 374. The line 372 is then disabled and a line 381 from decoder 16b is enabled. The line 3381 activates the record circuitry of the system through the input logic buffer 26 which functions as described in connection with FIG. 12. A line 380 couples the rate memory 370 to the enable line 381 for activation of the rate memory 370 to select the record speed from memory when the line 381 is enabled. The record speed code is conveyed from memory through a bus 390 to the rate input of the microprocessor 32. When the record command is issued by the decoder 16b as previously described, the line 381 is disabled.

For playback, the counter 320 selects the proper sector from the RAM 78 in the manner previously described along with the corresponding playback rate code from the rate memory ;170. During playback the line 380 is disabled causing the rate memory 370 to produce the playback rate code which is conveyed through the line 390 to the rate circuitry of the microprocessor 332 for setting the playback rate.

The playback rate codes are stored in sectors of the rate memory 370 corresponding with the sector in RAM in which the message to which the code relates is stored. As mentioned the sectors are selected by the message selector 50 both of which serve the function of memory sector selection. In this fashion, stored messages are matched to corresponding playback rate codes so the message is played at the proper rate.

In the embodiment of the invention thus far described, it will be understood that there is no means for protecting a message in memory and upon receiving an incoming, properly addressed signal, the system is automatically reset and the incoming signal will be converted and stored over any message or data already in memory. The modulator processor 16a, however, is readily adapted for the storage of a sequence of messages in memory and protection of stored messages by selective reset circuitry or manual reset circuitry which must be activated to initiate the message record and conversion mode after memory is full of unplayed messages or data.

As shown in FIG. 12, the leading edge detector 36 is removed from the system 10 and the reset switch 38 is manually activated to reinitiate the microprocessor 332 in the manner already described to reset memory for recording over material already stored in memory. The system requires no further reset in order to record multiple messages until the respective memory bank is full, at which time a stop enable is generated within the microprocessor 32 and memory for that bank is protected until reset. As illustrated in FIG. 12, a memory address selector 50, which is a standard 4 BIT code counter circuit is connected to the microprocessor 32 making possible the selection of different 4 BIT address combinations per RAM 78. It will be understood, however, that other address selector circuits may be employed such as 2 BIT counter circuits or manual selectors, as are well known in the art. The message address selector 50 is connected to the start line 30 for receipt of the logic high from the logic blocking circuit 56.

A manual reset switch 75 is provided for resetting the message address to its initial address setting for the playback of messages stored in the memory. Playback of messages occurs in the manner already described except that with the leading edge detector 36 out of the circuit the reset switch 38 must be manually activated to discharge the reset line 40 in the manner already described to reset the microprocessor 32 for receiving new incoming analog signals and recording over messages already in RAM.

No memory address circuitry is required for the modulation processor 12b of the transmitter group since message storage is under the control of the control terminal 11.

In an alternative form of the invention, a timer 52 may be used in place of the trailing edge detector 42. The use of a timer is panicuiarly required when the decoder 16b is of the type which emits a single pulse in response to a properly addressed incoming signal. As illustrated in FIG. 12, the trailing edge detector 42 and the line 44 are eliminated from the circuit and the timer, of conventional design, is connected to the line 43 for receiving the logic high from the input logic buffer In operation, the timer 52 is initiated by the logic high and upon expiration of a preset period of time, issues a negative pulse to the logic invenor 46 which issues a logic high to the stop line 48 to place the system 10 in the standby mode in the manner already described.

As illustrated in FIG. 12, a message indicator 54 may be included to indicate the arrival of a signal and the indicator 54 may also be employed to indicate that memory space is full. The message indicator 54 maybe a light, LED or a device for creating an audible tone. Such devices are well known in the art and do not, per se, form a part of this invention.

The voice storage system as described herein will find application in medical recording, industrial monitoring, as an electronic note pad and the like in addition to paging systems. The ability to transmit and playback at different rates can effect substantial reductions in air time making analog message paging systems practical. In addition, data which must be transmitted over telephone lines may be transmitted at a slower rate to retain the fidelity of the message and later played back at its normal rate without loss of fidelity.

FIGS. 14 through 17 illustrate a cellular telephone incorporating an analog-to-digital storage system in accordance with the present invention, as described hereinafter. The circuit descriptions with respect to cellular telephones are compatible with either portable hand held or mobile use. The general operation of the cellular telephone described herein is typical in the art of cellular telephones other than descriptions relating to capabilities with respect to transmitting and recording messages while the user is away from the unit. Typically certain push buttons on a conventional cellular telephone key pad are utilized to perform control operations, accordingly, one such push button is assigned to terminate a call and another is assigned to initiate a call. The conventional key pad is also utilized as a DTMF generator for the generation of DTMF tones used to signal remote devices such as credit card dialing or for long distance services. In the preferred embodiment, another such push button is programmed to activate the analog-to-digital voice storage system cellular telephone prior to leaving the unit.

Figure 14:
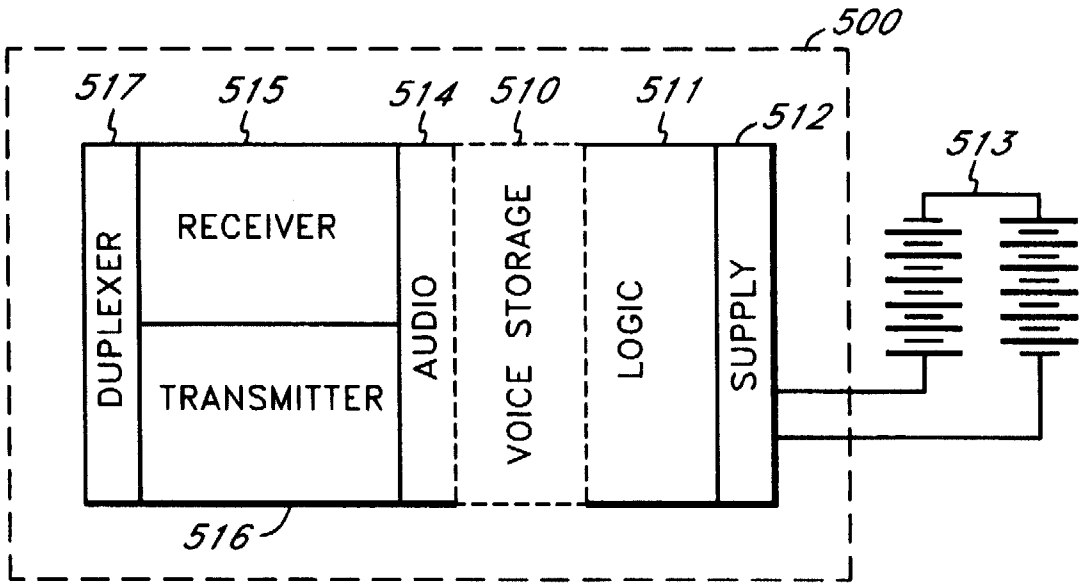
FIG. 14 is a block diagram of the transceiver circuit of an analog-to-digital voice storage cellular telephone of the present invention.

Referring now to FIG. 14, there is illustrated a block diagram of a transceiver circuit 500 of the analog-to-digital voice storage cellular telephone connected to a battery 513. The transceiver circuit 500 receives and monitors a control channel frequency transmitted by a remote transmitter. The transceiver circuit 500 typically includes a power supply 512 which regulates and distributes the necessary operating voltages. The transceiver circuit 500 additionally includes logic circuitry 511 which controls the call processing and switching functions of the cellular telephone. In a preferred embodiment of the analog-to-digital voice storage cellular telephone, voice storage circuitry 510 processes, stores and reproduces messages. Audio circuitry 514 is connected to the voice storage circuitry 510 for amplification and switching of both received and transmitted audio messages. The transceiver circuit 500 further comprises a receiver 515 for receiving transmissions from a remote cellular transmitter. A transmitter 516 transmits signals to a remote cell site receiver. The transmitter circuitry 516 and the receiver 515 are duplexed to a common antenna system (not shown) by a duplexer 517.

In operation, upon receiving a page or a call, the transceiver circuit 500 is commanded by the cent, rat cell site to tune to specific transmit and receive voice channels. Once an operator responds in one of two ways, such as taking the handset of the cellular telephone off the hook or by pushing the send button in response to some type of alert indicator such as in the case of a standard cellular telephone wherein full duplex communications are established. When placing a call, an operator enters a phone number and subsequently pushes the send button on the key pad of the cellular telephone handset. In response, the transceiver circuit 500 transmits a call request to the remote cellular receiver in a cell system. In response to the call request, the cell system transmitter transmits specific commands to the transceiver circuit 500 again establishing communications over designated transmit/receive frequencies (channels). To end a call, an operator may push the end button thereby generati.ng an end command request which is transmitted by the transceiver circuit 500 to the cell system wherein the cell system terminates the call. During voice communications, a SAT (Supervisory Audio Tone) signal in the range of approximately 6,000 Hz is transmitted from the cell system transmitter to the transceiver circuit 500. The transceiver circuit 500, upon receiving the SAT signal, transponds (retransmits) the SAT signal back to the cell system receiver where the tone is analyzed for signal to noise ratio and optionally phase of the SAT signal. The SAT signal is used by the cellular system to diagnose audio quality, and the like, for example processing "hand offs" whereby calls are transferred to adjacent [cells]e *cell* systems and or alternate frequencies in order to keep voice communications optimal. The SAT signal is used in alternate forms to detect *a clear channel or* an audio or message pathway in combination with the addition of the voice storage circuit 500 as will be explained in more detail hereinafter.

Figure 15:
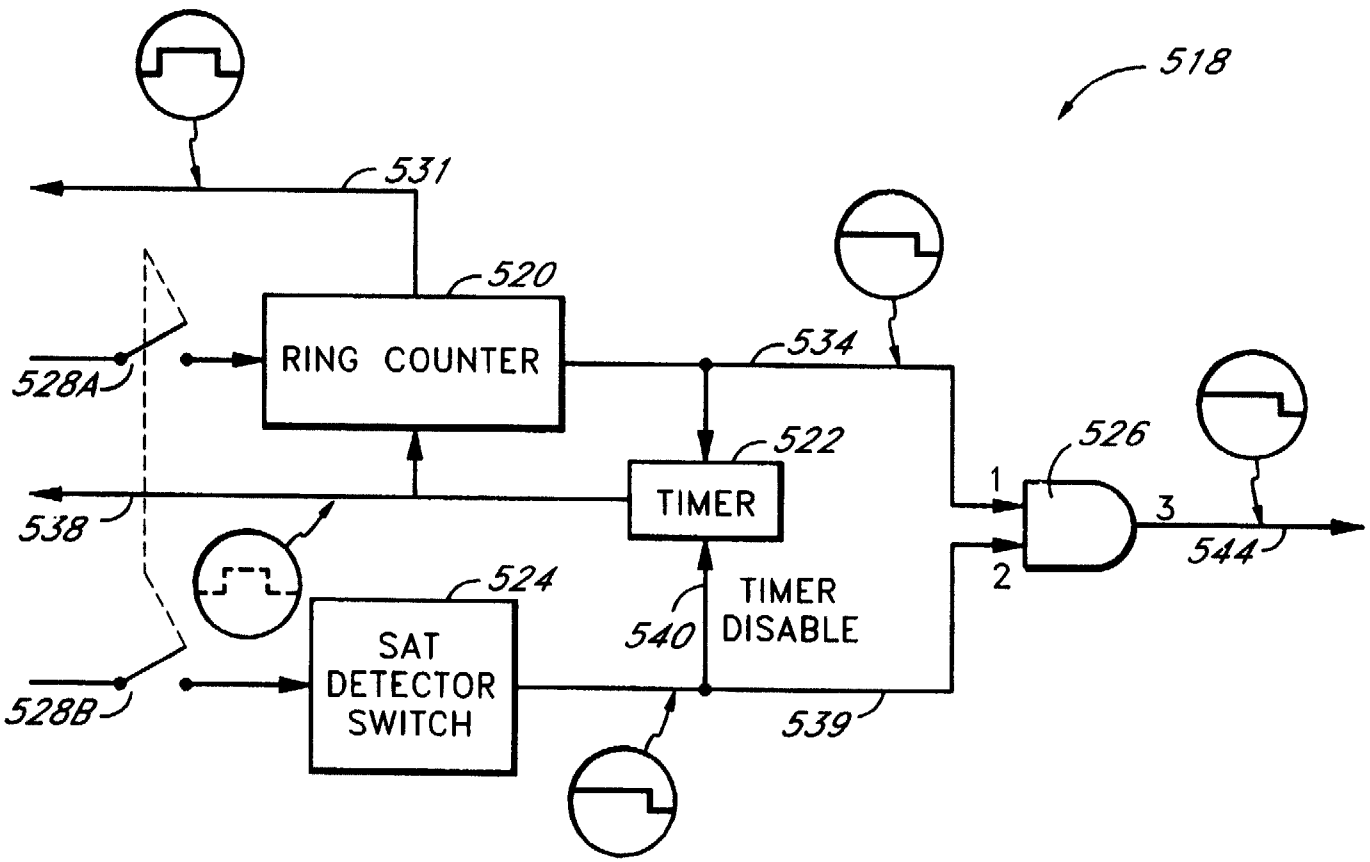
FIG. 15 is a detailed schematic diagram of the call answering and terminating circuitry of the present invention.

The voice storage circuitry 510 comprises call answering and terminating circuitry 518, shown generally in FIG. 15, which automatically answers (telephone "off hook") and terminates (telephone "on hook") incoming calls while the user is away from the voice storage cellular telephone. Referring now to FIG. 15, when the voice storage cellular telephone is activated by the cellular subscriber, switches 528A and 528B are closed. When the telephone handset is "on hook" and the switch S28A is closed, a ring counter 520, after a predetermined number of rings produces an enable output signal on line 534. The ring counter 520 may preferably be of the kind used with answering machines for standard telephones. In addition, the counter 520 may be substituted with a timer, or any other means known to those skilled in the art, to produce an enable output signal after a predetermined period of time subsequent to receiving a page or a call. A timer 522 is set to disable the enable signal on line 534 after a preset period of time. A SAT detector switch 524, which may be of commercially available design used with existing cellular telephone systems, is connected to another switch 528B. When the switch 528B is closed (telephone "off hook"), the SAT detector switch 534 waits to detect a SAT signal and in response thereto produces an enable high on a line 539. The output lines 534 and 539, from the ring counter 520 or timer and the SAT detector 524, respectively, are connected to first and second inputs of an AND gate 526. The enable signal on line 539 is also connected to the timer 522 on a line 540.

In operation, a ring or page signal from transceiver 500 through switch 528A is input to the ring counter 520, where after a predetermined number of ring, an "off hook" enable pulse through line 531 is produced which ennbles the cellular telephone to answer the call. This is the same as manually pushing the send button to answer the call. Ring counter 520 simultaneously produces a continuous enable signal on line 534 to the AND gate 526 and on line 535 to the timer 522. Upon receiving a continuous enable signal on line 535, the timer 522 is preset to disable the ring counter 520 after a predetermined period of time if the timer 522 is not interrupted by any other means. For example, if the preset period of time is deftned [at] *as* 5 seconds and the timer 522 is not disabled by other means within the 5 second period, the timer 522 issues a disable pulse to the ring counter 520 to reset the ring counter to its original state. The timer 522 simultaneously sends the disable pulse on line 538 to enable the voice storage cellular telephone to terminate the call. This is the same as manually pushing the end button to end the call.

When the call has been answered and the switch 528B is closed, the SAT signal indicating *a clear channel or* a message path is detected by the SAT detector 524, and the SAT detector 524 produces a continuous enable on line 539 to the AND gate 526. The AND gate 526 produces an activation signal upon receiving enable inputs from the ring counter 520 and the SAT detector 524 on lines 534 and 539 simultaneously. Once a SAT signal is detected, timer 522 is disable by the enable signal from the SAT detector 524 on line 540.

In operation, after a predetermined number of rings counted by the ring counter 520, the call is answered. If a SAT signal is received before the predetermined period of time clocked by the timer 522 expires, the timer 522 is disabled and both ring counter 520 and SAT detector 524 produce a continuous enable to the AND gate 526 where upon the AND gate produces an activation signal on line 544 to activate the voice storage unit 510, as will be explained in more detail hereinafter.

Figure 16:
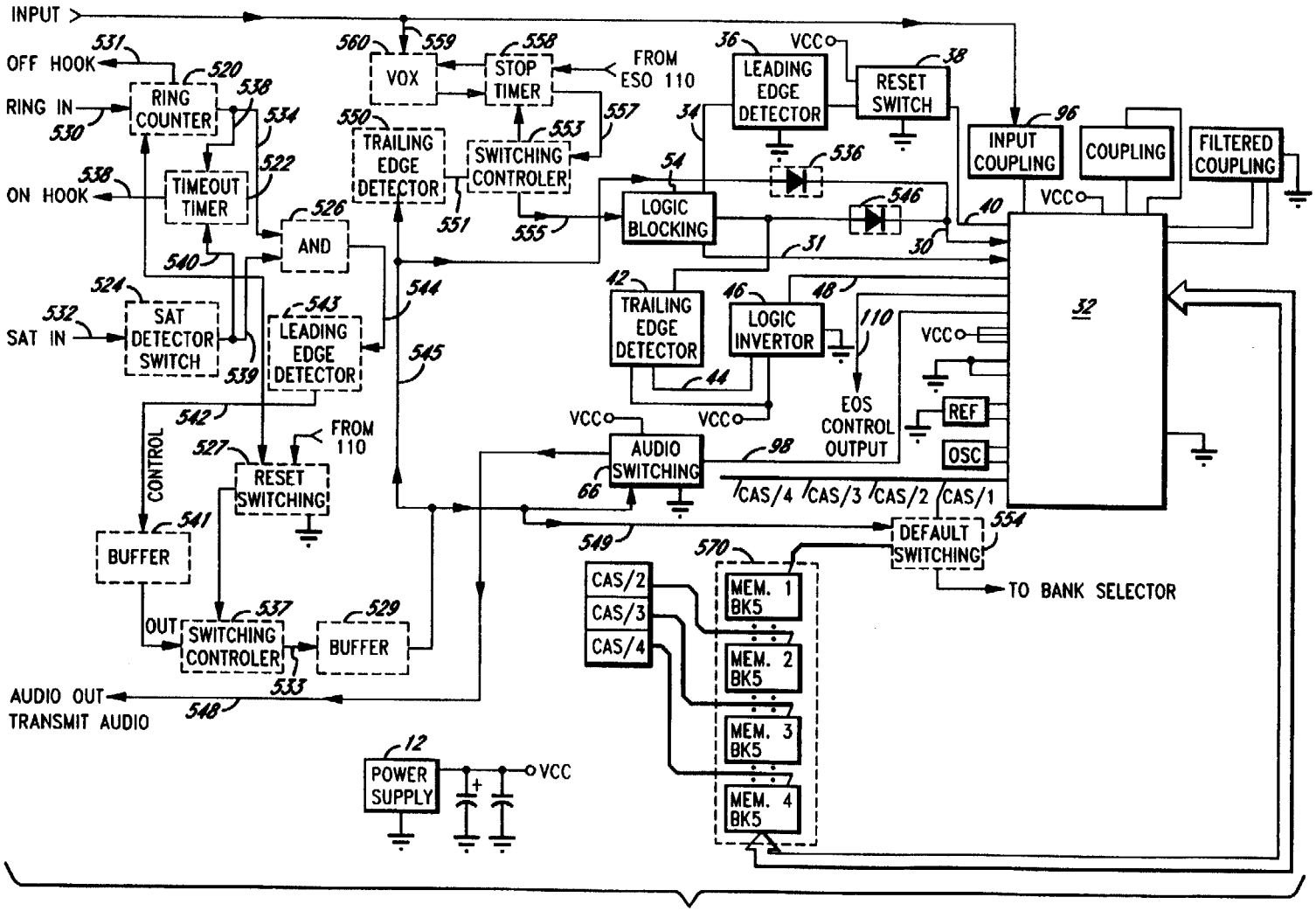
FIG. 16 is a detailed schematic diagram illustrating the audio conversion, switching and control circuitry shown in FIG. 2, together with the call answering and terminating circuitry shown in FIG. 15 with additional circuitry of the analog-to-digital voice storage cellular telephone of the present invention.

FIG. 16 illustrates the audio conversion, switching and control circuitry shown in FIG. 2 and previously described, in conjunction with the call answering and terminating circuitry 518 and additional circuitry of the voice storage cellular telephone.

Figure 17:
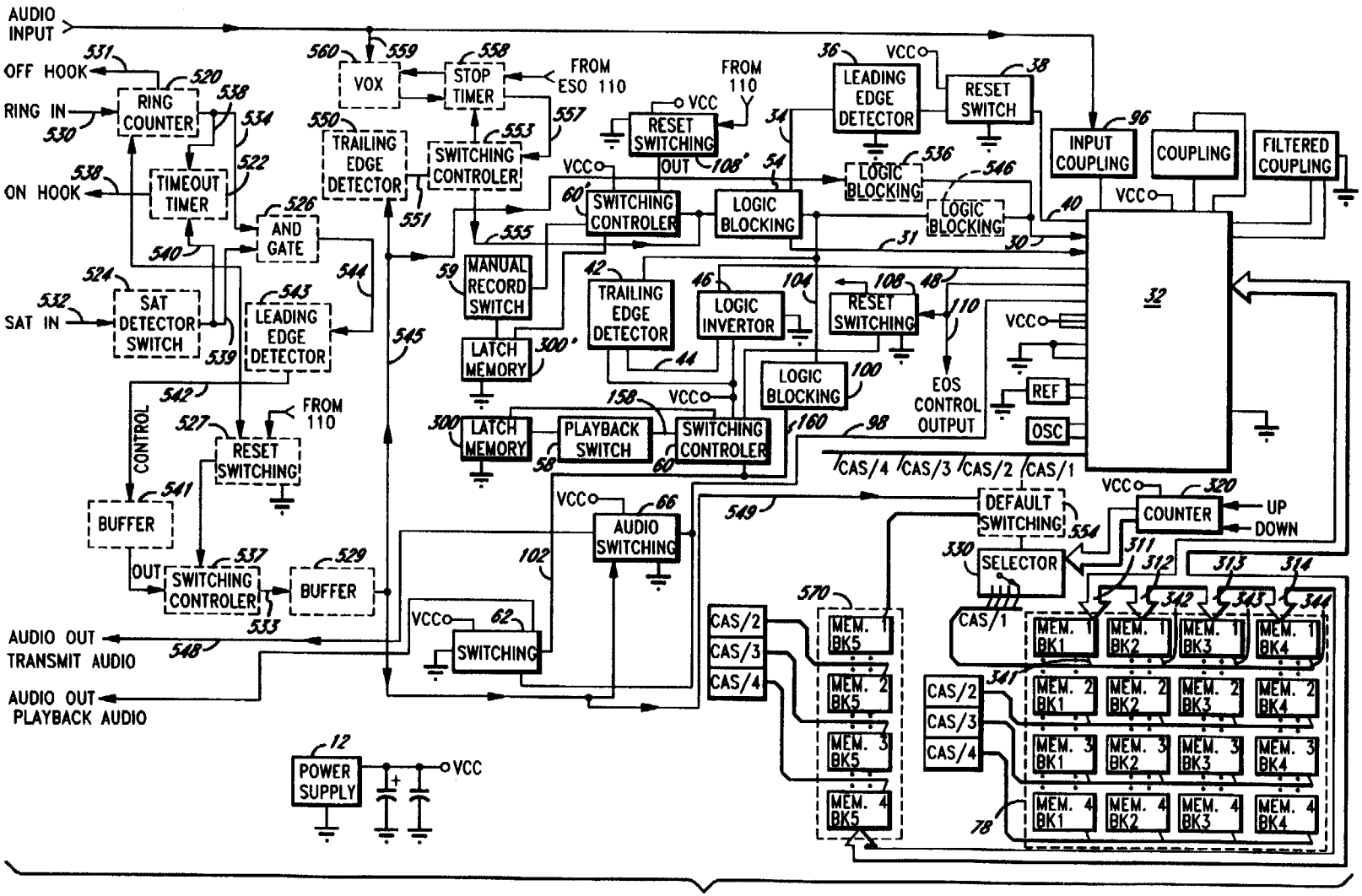
FIG. 17 is a detailed schematic diagram illustrating the circuitry shown in FIG. 7 together with the circuitry shown in FIG. 16.

FIG. 17 illustrates the overall combination of the circuitry shown in FIG. 15 together with the analog-to-digital storage system previously described and shown in FIG. 7.

Referring now to FIGS. 16 and 17, there is illustrated the preferred embodiment of the analog-to-digital voice storage system. A leading edge detector 543 is coupled to the line 544 for producing a momentary pulse on line 542 connected to a buffer 541. The pulse on line 542 activates the switching controller 537 which is connected to the output of the buffer 541. The switching controller 537 functions in a manner previously described, such that a continuous enable signal is produced at line 533 when the switching controller 537 is activated by the output of buffer 541. A reset switch 527 resets the switching controller 537 upon receiving switching commands from line 110 and line 538 to reset the circuitry to it's original stand by state.

In the circuitry thus far described it is possible to activate the play function of the voice storage circuitry 510 upon receiving a specified number of rings in combination with a subsequent SAT detection whereupon an enable signal is produced on line 544 from the AND gate 526. The enable signal is detected by the leading edge detector 543 creating a pulse on line 542 to buffer 541. The output of the buffer M1 is connected to switching controller 537 for creating an activation signal on line 533 to buffer 529. The buffer 529 connects the activation signal on line MS, through logic blocking circuitry 536, to a line 30 to activate the play function of the processor 32. The line 545 further activates the audio switch 66, thereby connecting the reproduced audio signal through the audio switch 66, to line 548. The play back audio is connected to the transceiver 500 in a manner facilitating transmission of the playback voice message by the transmitter 516. At the end of the playback message a stop command is generated by the processor 32 and a disable signal is produced on line 11 to the reset switch 517. The reset switch 527 resets the switching controller 537 to the original stand by state.

A logic blocking circuitry 546 has been added to isolate the line 30 from the trailing edge detector 42. In the circuitry thus far described, a voice message is transmitted automatically by the transceiver 500 after a specified number of rings. In addition to transmitting prestored voice messages, the transceiver 500 is adapted to record voice messages as will be explained hereinafter. A trailing edge detector 550 is connected to the line 545 for detecting the trailing edge of the activation signal, which occurs at the end of the transmitted voice message. At this time an enable signal is generated on line 555 to activate the record store functions of the digital voice storage circuitry of transceiver 500 in a manner previously described.

The switching controller 553 simultaneously activates a stop timer 558 for resetting the switching controller 553 after a preset period of time on a line 557. A VOX circuit 560 of the type commonly used in the art monitors input analog voice signals on an input line 559. The VOX circuit 560 produces a disable output when it detects analog voice messages being input and the disable output resets the stop timer 558. The stop timer 558 is also connected to another input line 110. When the stop timer 558 receives a disable signal on the line 110 from the processor 32, the stop timer 558 resets and disables the VOX circuit 560. A default switch 554 selects either the record memory for the recording of messages or the play memory for the transmission of an outgoing message. During the "play mode," line 549 is enabled which causes the default switch 554 to select memory 570 (Bank 5). When there is no enabling signal on line 549, the default switch 517 selects the record memory.

Manual record functions are provided for recording messages dictated by a user or messages from a caller received at the cellular phone and for recording prestored outgoing messages. Manual playback functions are provided for playing back previously recorded messages at the voice storage cellular telephone and for re-transmission of such messages. Stop functions are provided to manually stop both record and playback functions. Automatic record and playback functions are provided to automatically transmit a pre-stored voice message in response to receiving a call and automatic recording of incoming messages. The trailing edge detector 550 may be optionally supplemented with a DTMF decoder coupled to line 559 for decoding received DTMF signals for activating the record circuitry of the processor 32. The DTMF decoder, which may be of conventional design, should preferably include a comparator circuit for comparing decoded DTMF with a prestored user identification stored in an address register. Another outgoing message can preferably prompt the caller to enter a security code, after which the caller can enter a preassigned number through the keypad of his or her telephone. When the caller's telephone code number matches the prestored identification number, the record message sequence is activated in the manner previously described and the caller's message is recorded. In the event where the caller's identification code does not match the prestored identification code, the decoder generates an "On Hook" enable to break the message path and terminate the call. In this manner the voice storage system of the present invention prevents unauthorized use of its message storage features and thus advantageously reduces subscribers costs. The present invention also monitors the voice channel and disconnects ("on hook") the cellular telephone when a message pathway is interrupted in any way to reduce transmission time billing.

It should be fully understood that while the present system is fully adapted for use with current analog cellular telephone systems, the same steps of monitoring message paths, memory management and subscriber security may also be performed using digital signalling techniques.

As described herein, the voice storage system of the present invention may be incorporated in various communication systems such as two-way radio, telephone, intercom, mobile telephones and the like. The voice storage system of the present invention will find application in medical recording, industrial monitoring, as a voice scratchpad and the like, in addition to paging systems. The system of the present invention is readily incorporated in various receivers and transmitters/-receivers at the time of manufacture or may be incorporated in already existing conventional receivers and transmitters/receivers as an add-on item. The system of the present invention has low power requirements and thus is particularly well suited for use in paging systems where the remote receiver must be small and light, and, of necessity, has a limited power supply.

Having described the invention in connection with certain preferred embodiments thereof, it will be understood that many modifications and variations thereto are possible, all of which fall within the true spirit and scope of the invention.

What is claimed is:

1. A voice storage telephone operating in cooperation with one of a plurality of transceiver stations and answering calls without subscriber intervention having a transceiver for transmitting to and receiving voice messages from a remote caller via said one transceiver station, said voice storage telephone comprising:

a receiving circuit responsive to a call notification signal from said one transceiver station;

call answering circuitry connected to said receiving circuit, said call answering circuitry automatically answering incoming calls from said one transceiver station, said call answering circuitry automatically activated without user intervention after a predetermined period of time subsequent to receiving said call notification signal and generating an off-hook enable signal;

detection circuitry connected to said call answering circuitry, said detection circuitry sensing a clear channel signal transmitted from said one transceiver station and generating a detection enable signal;

a message recording circuit digitally recording said voice messages, said message recording circuit responsive to said off-hook enable signal from said call answering circuitry and said detection enable signal from said detection circuitry; and playback circuitry coupled to said message recording circuit for reproducing said voice messages.

2. A voice storage telephone operating in cooperation with one of a plurality of transceiver stations and answering calls without subscriber intervention as defined in claim 1, additionally comprising:

call terminating circuitry coupled to said detection circuitry, said call terminating circuitry generating an on-hook enable signal when said detection circuitry does not detect said clear channel signal.

3. A voice storage telephone operating in cooperation with one of a plurality of transceiver stations and answering calls without subscriber intervention as defined in claim 1, wherein said telephone additionally comprises:

rate conversion circuitry coupled to said message recording circuit, said rate conversion circuitry causing messages to be recorded in said message recording circuit at a different rate than said messages are read from said message recording circuit.

4. A voice storage telephone operating in cooperation with one of a plurality of transceiver stations and answering calls without subscriber intervention as defined in claim 2, additionally comprising:

a register having a prestored code; and a comparator comparing a personal identification code entered by said caller at a remote transmitter with said prestored code, said call answering circuitry generating said off-hook enable signal in response to said comparator when said personal identification code matches said prestored code.

5. A voice storage telephone operating in cooperation with one of a plurality of transceiver stations and answering calls without subscriber intervention as defined in claim 4, wherein said call terminating circuitry automatrically disconnects each of said incoming calls responsive to said comparator if said personal identification code does not match said prestored code.

6. A voice storage telephone operating in cooperation with one of a plurality of transceiver stations and answering calls without subscriber intervention as defined in claim 1, additionally comprising:

a recording switch connected to said recording circuit, said recording circuit recording dictated voice messages or telephone conversations responsive to said recording switch, said recording switch activated by said subscriber to record said messages.

7. A voice storage telephone operating in cooperation with one of a plurality of transceiver stations and answering calls without subscriber intervention having a transceiver for transmitting to and receiving voice messages from a remote caller via said one transceiver station, said voice storage telephone comprising:

a receiving circuit responsive to a call notification signal from said one transceiver station;

call answering circuitry automatically answering incoming calls from said one transceiver station, said call answering circuitry automatically activated without user intervention after a predetermined period of time subsequent to receiving said call notification signal and generating an off-hook enable signal;

detection circuitry connected to said call answering circuitry, said detection circuitry sensing a clear channel signal transmitted from said one transceiver station and generating a detection enable signal;

transmission circuitry connected to said detection circuitry, said transmission circuitry transmitting a prerecorded message to said one transceiver station responsive to said clear channel signal and said off-hook enable signal from said call answering circuitry;

a message recording circuit digitally recording said voice messages, said message recording circuit responsive to an end of said pre-recorded message; and playback circuitry coupled to said message recording circuit and reproducing said voice messages.

8. A voice storage telephone operating in cooperation with one of a plurality of transceiver stations and answering calls without subscriber intervention having a transceiver for transmitting to and receiving voice messages from a remote caller via said one transceiver station, said voice storage telephone comprising:

a receiving circuit responsive to a call notification signal from said one transceiver station;

call answering circuitry automatically answering incoming calls from said one transceiver station, said call answering circuitry automatically activated without user intervention after a predetermined period of time subsequent to receiving said call notification signal and generating an off-hook enable signal;

a message recording circuit digitally recording said voice messages transmitted at a first frequency by said one transceiver station, said message previously recorded at said one transceiver station at a second frequency, lower than said first frequency, said message recording circuit responsive to said off-hook enable signal from said cell answering circuitry; and playback circuitry coupled to said message recording circuit and reproducing said voice messages at a normal speech frequency.

[9. A voice storage telephone operating in cooperation with one of a plurality of transceiver stations and answering calls without subscriber intervention having a transceiver for transmitting to and receiving voice messages from a remote transceiver via said one transceiver station without intervention by a subscriber, said voice storage telephone receiving a personal identification code entered by a caller at said remote transceiver and comprising:

a receiving circuit responsive to a call notification signal from said one transceiver station;

a detector for verifying the presence of a clear channel signal received from said one transceiver station;

call answering circuitry responsive to said detector for generating an off-hook enable signal;

a register having a prestored code;

a comparator comprising said personal identification code with said prestored code: and call terminating circuitry responsive to said comparator for terminating a call when said personal identification code does not match said prestored code.]

10. A method for receiving, recording and reproducing voice messages from a remote transceiver via one transceiver station and answering calls without intervention by a subscriber, said method comprising the steps of:

receiving a call notification signal from said one transceiver station;

automatically answering an incoming call from said one transceiver station without user intervention after verification of a clear channel subsequent to receiving said call notification signal and generating an off-hook enable signal;

transmitting a pre-recorded message to said one transceiver station in response to said verification of said clear channel;

digitally recording said voice messages in response to an end of said pre-recorded message; and reproducing said voice messages in response to an operator command.

*11. A voice storage device operating in cooperation with one of a plurality of transceiver stations and answering calls without subscriber intervention having a transceiver for transmitting to said one transceiver station and receiving voice messages from a remote caller via said one transceiver station, said voice storage device comprising:*

*a receiving circuit responsive to a call notification signal from said one transceiver station;*

*call answering circuitry connected to said receiving circuit, said call answering circuitry automatically answering incoming calls from said one transceiver station, said call answering circuitry automatically activated without user intervention subsequent to receiving said call notification signal and generating an off-hook enable signal;*

*detection circuitry connected to said call answering circuitry, said detection circuitry sensing a clear channel between said one transceiver station and said voice storage device and generating a detection enable signal;*

*a message recording circuit recording timed samples representative of said voice messages, said message recording circuit responsive to said off-hook enable signal from said call answering circuitry and said detection enable signal from said detection circuitry; and*

*playback circuitry coupled to said message recording circuit for reproducing said voice messages from said timed samples.*

*12. A voice storage device operating in cooperation with one of a plurality of transceiver stations and answering calls without subscriber intervention as defined in claim 1, additionally comprising:*

*call terminating circuitry coupled to said detection circuitry, said call terminating circuitry generating an onhook enable signal when said detection circuitry does not detect said clear channel.*

*13. A voice storage device operating in cooperation with one of a plurality of transceiver stations and answering calls without subscriber intervention as defined in claim 11, wherein said device additionally comprises:*

*rate conversion circuitry coupled to said message recording circuit, said rate conversion circuitry causing messages to be recorded in said message recording circuit at a different rate than said messages are read from said message recording circuit.*

*14. A voice storage device operating in cooperation with one of a plurality of transceiver stations and answering calls without subscriber intervention as defined in claim 12, additionally comprising:*

*a register having a prestored code; and*

*a comparator comparing a personal identification code entered by said caller at a remote transmitter with said prestored code, said call answering circuitry generating said off-hook enable signal in response to said comparator when said personal identification code matches said prestored code.*

*15. A voice storage device operating in cooperation with one of a plurality of transceiver stations and answering calls without subscriber intervention as defined in claim 14, wherein said call terminating circuitry automatically disconnects each of said incoming calls responsive to said comparator if said personal identification code does not match said prestored code.*

*16. A voice storage device operating in cooperation with one of a plurality of transceiver stations and answering calls without subscriber intervention as defined in claim 11, additionally comprising:*

*a recording switch connected to said recording circuit, said recording circuit recording dictated voice messages or telephone conversations responsive to said recording switch, said recording switch activated by. said subscriber to record said messages.*

17. *A voice storage device operating in cooperation with one of a plurality of transceiver stations and answering calls without subscriber intervention having a transceiver for transmitting to said one transceiver station and receiving voice messages from a remote caller via said one transceiver station, said voice storage device comprising:*

*a receiving circuit responsive to a call notification signal from said one transceiver station;*

*call answering circuitry automatically answering incoming calls from said one transceiver station, said call answering circuitry automatically activated without user intervention subsequent to receiving said call notification signal and generating an off-hook enable signal;*

*detection circuitry connected to said call answering circuitry, said detection circuitry sensing a clear channel between said one transceiver station and said voice storage device and generating a detection enable signal;*

*transmission circuitry connected to said detection circuitry, said transmission circuitry transmitting a prerecorded message to said one transceiver station responsive to said clear channel and said off-hook enable signal from said call answering circuitry;*

*a message recording circuit recording timed samples representative of said voice messages, said message recording circuit responsive to an end of said prerecorded message; and*

*playback circuitry coupled to said message recording circuit and reproducing said voice messaqes from said timed samples.*

18. *A voice storage device operating in cooperation with one of a plurality of transceiver stations and answering calls without subscriber intervention having a transceiver for transmitting to said one transceiver station and receiving voice messages from a remote caller via said one transceiver station, said voice storage device comprising:*

*a receiving circuit responsive to a call notification signal from said one transceiver station;*

*call answering circuitry automatically answering incoming calls from said one transceiver station, said call answering circuitry automatically activated without user intervention subsequent to receiving said call notification signal and generating an off-hook enable signal;*

*a messaqe recording circuit recording timed samples representative of said voice messages transmitted at a first frequency by said one transceiver station, said messages previously recorded at said one transceiver station at a second frequency, lower than said first frequency, said message recording circuit responsive to said off-hook enable signal from said call answering circuitry; and*

*playback circuitry coupled to said message recording circuit and reproducing said voice messages from said timed samples at a normal speech frequency.*

19. *A voice storage device operating in cooperation with one of a plurality of transceiver stations and answering calls without subscriber intervention having a transceiver for transmitting to said one transceiver station and receiving voice messages from a remote transceiver via said one transceiver station without intervention by a subscriber, said voice storage device receiving a personal identification code entered by a caller at said remote transceiver and comprising:*

*a receiving circuit responsive to a call notification signal from said one transceiver station;*

*a detector for verifying the presence of a clear channel between said one transceiver station and said voice storage device;*

*call answering circuitry responsive to said receiving circuit for generating an off-hook enable signal, said call answering circuitry enabling voice storage based upon the generation of said off-hook enable signal and the verification of the presence of said clear channel;*

*a register having a prestored cod;*

*a comparator comparing said personal identification code with said prestored code; and*

*call terminating circuitry responsive to said comparator for terminating call when said*

*call terminating circuitry responsive to said comparator for terminating of call when said personal identification code does not match said prestored code.*

20. *A method for receiving, recording and reproducing voice messages from a remote transceiver via one transceiver station and answering calls without intervention by a subscriber, said method comprising the steps of:*

*receiving a call notification signal from said one transceiver station;*

*generating an off-hook enable signal after receiving said call notification signal;*

*automatically answering an incoming call from said one transceiver station without user intervention after verification of a clear channel and after generating said off-hook enable signal;*

*transmitting a pre-recorded message to said one transceiver station in response to said verification of said clear channel;*

*recording timed samples representative of said voice messages in response to an end of said pre-recorded message; and*

*reproducing said voice messages from said timed samples in response to an operator command.*

* * * * *

UNITED STATES PATENT AND TRADEMARK OFFICE

CERTIFICATE OF CORRECTION

PATENT NO. : Re. 34,976

DATED : 20 June 1995

INVENTOR(S) : Richard J. HELFERICH

It is certified that error appears in the above-identified patent and that said Letters Patent is hereby corrected as shown below:

| Column | Line | |
|---|---|---|
| 1 | 50 | Change "green" to --screen--. |
| 3 | 63 | Change "earfled" to --carried--. |
| 4 | 51 | Change "convened" to --converted--. |
| 5 | 49 | Change "requirementS" to --requirements--. |
| 5 | 65 | Change "oldest" to --(oldest--. |
| 6 | 2 | Change "trait" to --unit--. |
| 6 | 14 | Change "ease" to --case--. |
| 6 | 16 | Change "future" to --feature--. |
| 6 | 42 | Change "ofthe" to --of the--. |
| 7 | 21 | Before "As" do not indent. |

UNITED STATES PATENT AND TRADEMARK OFFICE

CERTIFICATE OF CORRECTION

PATENT NO. : Re. 34,976

DATED : 20 June 1995

INVENTOR(S) : Richard J. HELFERICH

It is certified that error appears in the above-identified patent and that said Letters Patent is hereby corrected as shown below:

| Column | Line | |
|---|---|---|
| 8 | 47 | Change "$6" to --56--. |
| 8 | 51 | Change "$8" to --58--. |
| 9 | 39 | Change "40" to --40--. |
| 11 | 4 | Change "M" to --54--. |
| 11 | 36 | Delete "30". |
| 11 | 61 | Change "415," to --46,--. |
| 12 | 57 | Change "GAS" to --CAS--. |
| 13 | 4 | Change "Found" to --ground--. |
| 14 | 8 | Change "reconvened" to --reconverted--. |
| 14 | 47 | Change "preprograrnmed" to --preprogrammed--. |
| 14 | 65 | Change "pan" to --part--. |

UNITED STATES PATENT AND TRADEMARK OFFICE

CERTIFICATE OF CORRECTION

PATENT NO. : Re. 34,976

DATED : 20 June 1995

INVENTOR(S) : Richard J. HELFERICH

It is certified that error appears in the above-identified patent and that said Letters Patent is hereby corrected as shown below:

| Column | Line | |
|---|---|---|
| 15 | 22 | Change "todd" to --code--. |
| 15 | 43 | Change "tile" to --the--. |
| 15 | 65 | After "FIG." delete "[4]". |
| 16 | 10 | After "will" change "*used*" to --be--. |
| 16 | 30 | Change "circuh" to --circuit-- |
| 16 | 62 | Change "axe" to --are--. |
| 16 | 64 | Change "normall" to --normally--. |
| 17 | 4-5 | Change "paniculaxly" to --particularly--. |
| 17 | 12 | Delete "[10]". |
| 17 | 19 | After "the" change "an" to --art--. |
| 17 | 34 | Change "mount" to --amount--. |

UNITED STATES PATENT AND TRADEMARK OFFICE

CERTIFICATE OF CORRECTION

PATENT NO. : Re. 34,976

DATED : 20 June 1995

INVENTOR(S) : Richard J. HELFERICH

It is certified that error appears in the above-identified patent and that said Letters Patent is hereby corrected as shown below:

| Column | Line | |
|---|---|---|
| 17 | 61 | Change "eausing" to --causing--. |
| 19 | 15 | Change "partrs," to --parts,--. |
| 19 | 32 | Change "3381" to --381--. |
| 19 | 46 | Change ";170" to --370--. |
| 20 | 6 | Change "332" to --32--. |
| 20 | 40 | Change "panicuiarly" to --particularly--. |
| 20 | 46 | After "buffer" insert --26.--. |
| 20 | 49 | Change "invenor" to --invertor--. |
| 21 | 46 | Change "cent, rat" to --central--. |
| 21 | 63 | Change "generati.ng" to --generating--. |
| 22 | 8 | Delete "[cell]e". |

UNITED STATES PATENT AND TRADEMARK OFFICE

CERTIFICATE OF CORRECTION

PATENT NO. : Re. 34,976

DATED : 20 June 1995

INVENTOR(S) : Richard J. HELFERICH

It is certified that error appears in the above-identified patent and that said Letters Patent is hereby corrected as shown below:

| Column | Line | |
|---|---|---|
| 22 | 24 | Change "S28A" to --528A--. |
| 22 | 47 | Change "ring," to --rings,--. |
| 22 | 58 | Delete [at]". |
| 23 | 6 | Change "disable" to --disabled--. |
| 23 | 47 | Change "M1" to --541--. |
| 23 | 50 | Change "MS" to --545--. |
| 23 | 59 | Change "11" to --110--. |
| 23 | 60 | Change "517" to --527--. |
| 26 | 18 | Change "tomatrically" to --tomatically--. |
| 28 | 26 | Change "claim 1" to --claim 11--. |
| 28 | 30 | Change "onhook" to —on-hook—. |

UNITED STATES PATENT AND TRADEMARK OFFICE

CERTIFICATE OF CORRECTION

PATENT NO. : Re. 34,976

DATED : 20 June 1995

INVENTOR(S) : Richard J. HELFERICH

It is certified that error appears in the above-identified patent and that said Letters Patent is hereby corrected as shown below:

| Column | Line | |
|---|---|---|
| 28 | 67 | After "by" delete ".". |
| 30 | 25 | Change "cod" to --code--. |
| 30 | 29 | Before "call" insert --a--. |
| 30 | 30 | Delete entire line. |
| 30 | 31 | Delete "for terminating of call when said". |

Signed and Sealed this

Tenth Day of September, 1996

*Attest:*

*Attesting Officer*

BRUCE LEHMAN

*Commissioner of Patents and Trademarks*